US006763139B1

(12) United States Patent
Andrew

(10) Patent No.: US 6,763,139 B1
(45) Date of Patent: Jul. 13, 2004

(54) IMAGE CODING METHOD AND APPARATUS FOR LOCALIZED DECODING AT MULTIPLE RESOLUTIONS

(75) Inventor: James Philip Andrew, Waverton (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/337,533

(22) Filed: Jun. 22, 1999

(30) Foreign Application Priority Data

Jul. 3, 1998 (AU) ............................................. PP4468
Sep. 7, 1998 (AU) ............................................. PP5749

(51) Int. Cl.[7] ............................................. G06C 9/36
(52) U.S. Cl. ...................... 382/240; 382/232; 382/233; 382/248
(58) Field of Search ................................. 382/240, 232, 382/233, 248, 239; 341/67, 50; 345/420; 375/240.1

(56) References Cited

U.S. PATENT DOCUMENTS

| 5,631,978 A | | 5/1997 | Galand et al. ............... 382/240 |
| 5,682,152 A | * | 10/1997 | Wang et al. ................... 341/50 |
| 6,141,446 A | * | 10/2000 | Bolick et al. ............... 382/233 |
| 6,314,452 B1 | * | 11/2001 | Dekel et al. ................. 709/203 |
| 6,326,965 B1 | * | 12/2001 | Castelli et al. .............. 345/420 |

FOREIGN PATENT DOCUMENTS

| EP | 0841818 A1 | 5/1998 | ............ H04N/7/26 |
| GB | 2 281 465 A | 3/1995 | ............ H04N/7/26 |
| GB | 2 303 031 A | 2/1997 | ............ H03M/7/30 |
| WO | WO 93/20650 | 10/1993 | ............ H04N/7/13 |
| WO | WO 98/11728 | 3/1998 | ............ H04N/7/26 |
| WO | WO 98/19274 | 5/1998 | ............ G06T/9/40 |

OTHER PUBLICATIONS

Coifman et al., "Entropy–Based Algorithm for Best Basis Selection", IEEE, Transactions on Information Theory, vol. 38, No. 2, Mar. 1992, pps. 713–718.*
de Queiroz, Ricardo, et al., "Wavelet Transforms in a JPEG–Like Image Coder", IEEE Transactions on Circuits and Systems for Video Technology, US, IEEE Inc. New York, vol. 7, No. 2, Apr. 1, 1997, pp. 419–424.
Sementilli, Philip J., et al., "Wavelet TCQ: Submission to JPEG–2000", Proceedings of the SPIE Conference on Applications of Digital Image Processing XXI, San Diego, CA, Jul. 1998, SPIE, vol. 3460, 1998, pp. 2–12.

* cited by examiner

Primary Examiner—Anh Hong Do
(74) Attorney, Agent, or Firm—Fitzpatrick, Cella, Harper & Scinto

(57) ABSTRACT

The method generates a compressed digital image from a original image. The compressed digital image allows random access to portions of the compressed image at a number of resolutions. The original image is first transformed (103) by a multi-level DWT to form a non redundant multiple resolution frequency domain representation of the image. The representation comprises a DC subband and a plurality of high frequency subbands arranged as levels, where each level represents a frequency contribution between adjacent resolutions and where each subband comprises a plurality of tiles. The DC subband is then entropy encoded (104) into the bitstream. The high frequency subbands are next entropy encoded (108,109, and 110) into the bitstream in level order (105,113,114) and tile order (107,111).

87 Claims, 10 Drawing Sheets

IMAGE CODING METHOD AND APPARATUS FOR LOCALIZED DECODING AT MULTIPLE RESOLUTIONS

FIELD OF INVENTION

The present invention relates to a method and apparatus for digital image compression and in particular to an encoding method which allows efficient decoding of a localised portion of a digital image.

BACKGROUND OF INVENTION

The JPEG compression standard is widely used for image compression. It offers good rate-distortion (compression) performance. In the baseline mode efficient random access is possible. However, variable resolution decoding is not particularly efficient, since the information for each (8×8) image blocks is stored contiguously in the compressed image bit stream. For example, to read just the DC coefficients from baseline mode coded JPEG image to decode a very low resolution version of the image from a disk is typically as costly (if possibly not more costly) as reading the whole JPEG image from the disk, since the DC coefficients are interspersed all along the bit stream.

A hierarchical JPEG mode on the other hand offers efficient decoding of different resolutions (or image sizes) but does not allow such an efficient random access. Further, the hierarchical JPEG format itself is redundant. That is, a hierarchical JPEG mode typically gives a 33% larger compressed file than the other modes, since the different image resolutions are stored somewhat independently.

There is a current generation of image compression techniques that offer better rate-distortion performance than the baseline JPEG. These techniques are typically subband coding schemes and are usually discrete wavelet transform based.

Traditionally these subband schemes do not offer efficient random access. The problem with these schemes are that the subbands are interspersed in a bit stream and to decode a portion of the image requires searching the bit stream for coefficients relating to the desired portion of the image to be decoded. This is quite inefficient particularly where the information (coefficients) is read from memory storage devices having relatively long access times. Such devices include CD ROM drives, floppy disk drives, hard disk drives and alike.

Reading data from storage media such as hard disks and CD ROM drives is often a relatively time consuming operation. In particular it takes a relatively long time to do a seek operation: that is to find the start of any given data segment on the storage media. For this reason when reading data a minimum data chunk is typically read. Thus reading small data segments regularly situated in a large bit stream can be as time consuming as reading the whole bit stream.

These current methods of compression have a number of disadvantages when used to decode a portion of an image. Either the current methods do not provide: a) a non redundant representation, which translates to poor compression rates; b) a multiple resolution representation; or c) a representation capable of relatively efficient substantially random access to predetermined localised portions of an image.

SUMMARY OF INVENTION

It is an object of the present invention to ameliorate one or more disadvantages of the prior art.

According to one aspect of the present invention there is provided a method of encoding a coded representation of a digital image, wherein the coded representation includes a non-redundant hierarchical code, having one low frequency subband and a plurality of high frequency subbands arranged in levels, which levels combine to represent multiple resolutions of the image, said method including the steps of: a) dividing each subband into a plurality of tiles; b) entropy encoding each tile; c) selecting a plurality of desired resolutions from said multiple resolutions; and d) arranging in contiguous manner, for each level between each pair of adjacent selected resolutions, each entropy encoded tile representing substantially the same portion of image into a bit stream.

According to another aspect of the present invention there is provided a method of encoding a digital image, to provide substantially random access to portions of said image at a plurality of nominated resolutions, said method including the steps of: applying a linear transform to said image to produce a plurality of transform coefficients in a frequency domain; grouping the transform coefficients into frequency subbands, each subband representing a range of frequencies of the image, wherein said grouping is characterised by one low frequency subband and a plurality of high frequency subbands arranged in levels, and wherein each level represents frequency contributions between adjacent nominated resolutions of the image; dividing each frequency subband into a plurality of tiles, each tile comprising at least one of said transform coefficient; quantising and entropy coding each said tile; and arranging in a contiguous manner, for each level, those encoded tiles which substantially correspond to the same portions of the image into a bit stream.

According to still another aspect of the present invention there is provided a method of encoding a digital image into a bit stream, to provide substantially random access to portions of said image at a plurality of nominated resolutions, said method including the steps of: applying a discrete wavelet transform to said image to produce a non-redundant multiple resolution frequency domain representation of the image, said representation comprising one low frequency subband and a plurality of high frequency subbands arranged in levels, wherein each level represents frequency contributions between adjacent resolutions of the image; dividing each frequency subband into a plurality of tiles; quantising and entropy coding each said tile; nominating desired resolutions of the digital image; and arranging in a contiguous manner, for each level between nominated resolutions, those tiles which substantially correspond to the same portions of the image into the bit stream.

According to still another aspect of the present invention there is provided a method of encoding a digital image including the steps of: applying a linear transform to said image to produce a non-redundant multiple resolution frequency domain representation of the image, said representation comprising a plurality of levels, wherein each level represents frequency contributions between adjacent resolutions of the image; dividing said non-redundant multiple resolution frequency domain representation into a plurality of tiles; quantising and entropy coding each said tile; nominating desired resolutions of the digital image; and arranging contiguous manner, for each level between nominated resolutions, those tiles which substantially correspond to the same portions of the image.

According to still another aspect of the present invention there is provided a method of encoding a coded representation of a digital image, wherein the coded representation includes a non-redundant hierarchical code, having one low frequency subband and a plurality of high frequency subbands arranged in levels, which levels combine to represent multiple resolutions of the image, said method including the steps of: a) dividing each subband into a plurality of tiles; b) selecting a predetermined number of said levels from said multiple resolutions; c) entropy encoding each tile; d) processing said selected levels in a predetermined sequential order; and e) arranging in contiguous manner, for each level in said sequence to a current level not processed in step d), each entropy encoded tile representing substantially the same portion of image into a bit stream.

According to still another aspect of the present invention there is provided a method of encoding a digital image into a bit stream, said method including the steps of: applying a discrete wavelet transform to said image to produce a non-redundant multiple resolution frequency domain representation of the image, said representation comprising one low frequency subband and a plurality of high frequency subbands arranged in levels, wherein each level represents frequency contributions between adjacent resolutions of the image; dividing each frequency subband into a plurality of tiles; quantising and entropy coding each said tile; arranging into said bit stream in a predetermined order each said entropy tile of a DC subband; and arranging in a contiguous manner each set of three encoded tiles belonging to each of three AC subbands respectively, which substantially correspond to the same portions of the image at each level, into the bit stream.

According to still another aspect of the present invention there is provided a method of encoding a digital image into a bit stream, said method including the steps of: applying a discrete wavelet transform to said image to produce a non-redundanit multiple resolution frequency domain representation of the image, said representation comprising a DC subband and a plurality of AC subbands arranged in a hierarchical structure having a plurality of levels, wherein each level represents frequency contributions between adjacent resolutions of the image; dividing each frequency subband into a plurality of tiles; grouping each tile, substantially corresponding to a same portion of the digital image, at each level of the AC subbands into tile triplets; entropy coding each tile of a DC subband and each tile triplet of the AC subbands; arranging in a predetermined order each said entropy tile of a DC subband and each entropy encoded tile triplet into a sequential stream.

According to still another aspect of the present invention there is provided a method of encoding a sequential stream of data for providing substantially random access to portions of an image at a plurality of predetermined resolutions, said stream including a non-redundant multiple resolution frequency domain representation of the image, said representation comprising one low frequency subband and a plurality of high frequency subbands arranged in levels, wherein each subband is divided into a plurality of tiles and each level represents frequency contributions between adjacent resolutions of the image, and wherein each tile represents a frequency contribution to a portion of the image at a predetermined resolution, said method including: inserting at most one pointer in said sequential stream for each set of tiles which correspond to substantially a same spatial portion of the image for each level to access a portion of the digital image.

According to still another aspect of the present invention there is provided a method of decoding a sequential stream of data for providing substantially random access to portions of an image at a plurality of predetermined resolutions, said stream including a non-redundant multiple resolution frequency domain representation of the image, said representation comprising one low frequency subband and a plurality of high frequency subbands arranged in levels, wherein each subband is divided into a plurality of tiles and each level represents frequency contributions between adjacent resolutions of the image, and wherein each tile represents a frequency contribution to a portion of the image at a predetermined resolution, said method including: retrieving at most one pointer in said sequential stream for each set of tiles which correspond to substantially a same spatial portion of the image for each level to access a portion of the digital image.

According to still another aspect of the present invention there is provided a method of encoding a digital image, the method including the steps of: applying a linear transform to said image to produce a non-redundant multiple resolution frequency domain representation of the image, said representation comprising one low frequency subband and a plurality of high frequency subbands arranged in levels, wherein each level represents frequency contributions between adjacent resolutions of the image and each subband comprises a plurality of tiles; and entropy coding each said tile into a bitstream, wherein said entropy encoding step comprises the following sub-steps: entropy encoding the tiles of the low frequency subband into the bitstream; and entropy encoding the tiles of the high frequency subbands into the bitstream in level and tile order.

Additional aspects of the present invention are described in the claims at the end of this specification.

BRIEF DESCRIPTION OF THE DRAWINGS

Embodiments of the invention are described with reference to the drawings, in which.

DETAILED DESCRIPTION

Preferred Embodiment

Figure 1:
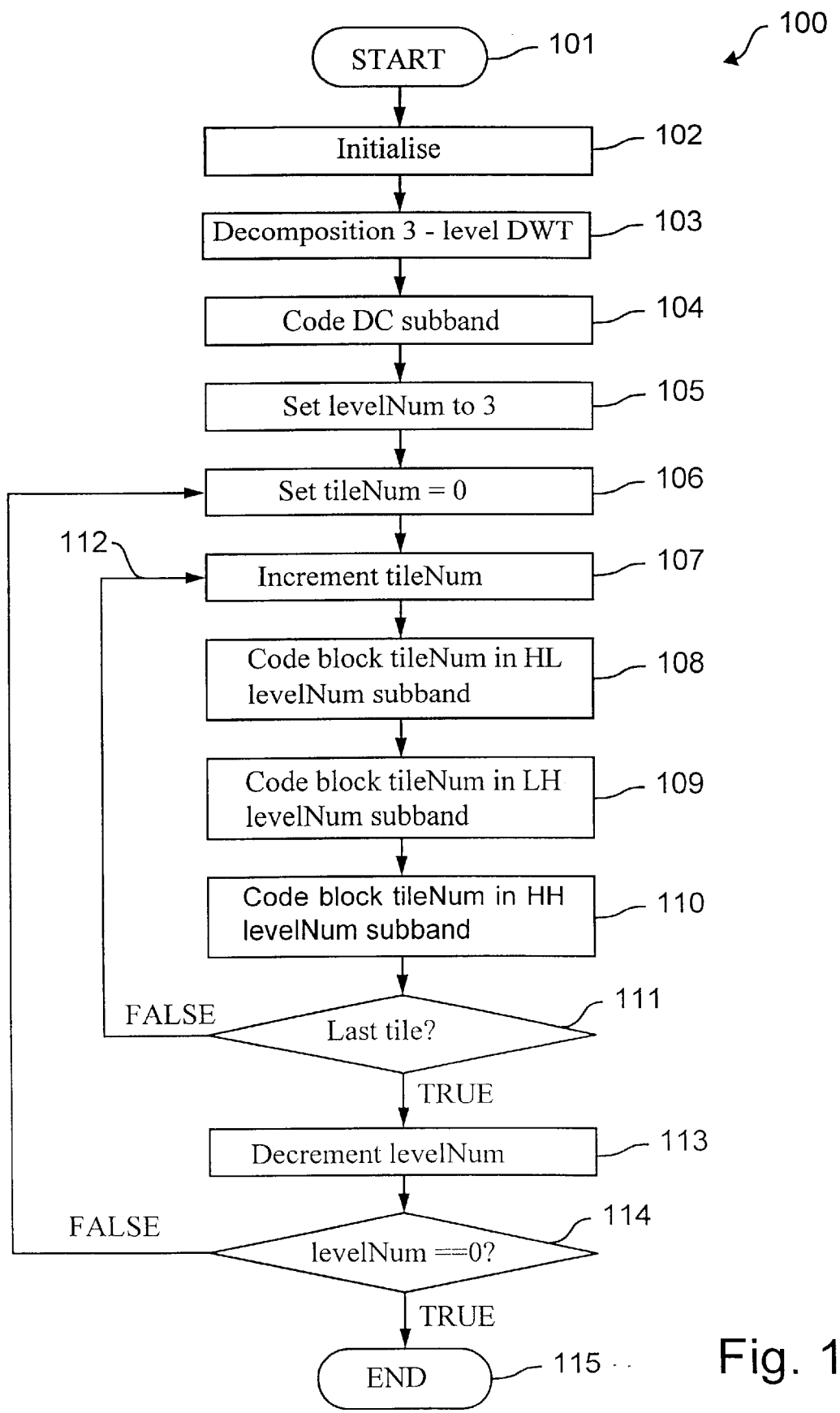
FIG. 1 is a block diagram of an image encoding process in accordance with a preferred embodiment of the invention.

Referring to FIG. 1, there is shown a flow diagram of an encoding process 100 in accordance with the preferred embodiment of the present invention. At a starting step 101, a digital image is input and an initialisation step 102 for the encoding process 100 is performed. The initialisation step 102 sets encoding parameters, such as compression quality and a compression factor for the digital image, to desired values.

Next, a decomposition step 103 is executed which performs a multi-level subband decomposition of the image. The multi-level subband decomposition of the image provides a plurality of coefficients, typically, partitioned into a plurality of blocks (or subband). The coefficients provide a non-redundant multiple resolution (or size) frequency domain representation of the digital (spatial domain) image.

In this context non-redundant refers that a number of values at a first representation of an image is substantially equal to the number of values required for a second representation of the image. That is the total number of coefficients in the frequency domain representation is substantially equal to the total number of pixel values of the image in the spatial domain representation. Thus, a multiple resolution (frequency domain) representation of the image is achieved without duplication of the pixel values or corresponding coefficient.

In the preferred embodiment of the present invention the multi-level subband decomposition is a 3-level discrete wavelet transform (DWT). However, other transforms which provide a subband decomposition can be substituted without departing from the scope and spirit of the present invention. For example, a discrete cosine transform (DCT) can be used.

The number of levels to which the DWT is applied generally depends on a size of an image to be transformed and a number of resolutions (sizes) desired. Typically, an N-level DWT provides an N+1 total number of resolutions including a highest resolution (full size) of the image.

Figure 2:
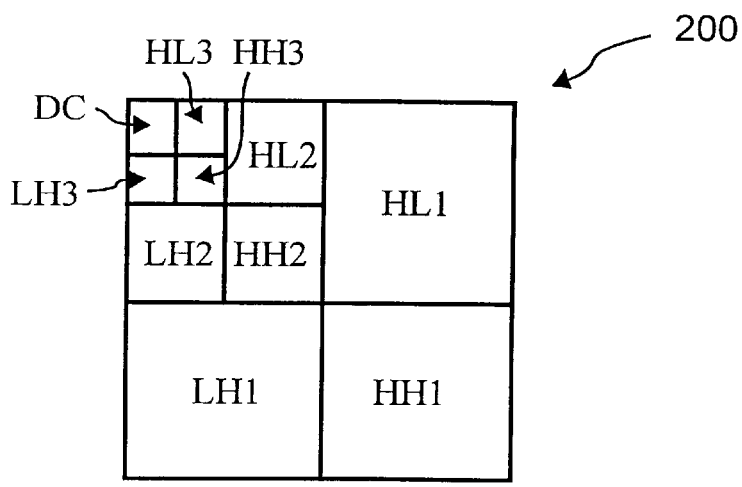
FIG. 2 is a schematic diagram of a coded representation according to a preferred embodiment of the invention.

Referring to FIG. 2, there is shown a representation 200 of a 3-level DWT of an image. Typically each level consists of three high frequency subbands except for the highest or last level which consists of three high frequency subbands and a DC (low frequency) subband. The plurality of coefficients of a 3-level DWT result from three applications of a single level DWT. These coefficients are grouped (or partitioned) into subbands according to a frequency or frequency range represented by each coefficient. The subbands are labelled DC, HL3, HH3, LH3, HL2, HH2, LH2, HL1, HH1 and LH1. The DC subband block contains the lowest frequency (or DC) coefficients and represents a lowest resolution (size) of the image in the frequency domain. The level three (3) subband triplet HL3, HH3 and LH3 together with the DC subband represents a next higher resolution of the image in the frequency domain. The DC subband, the level three subband triplet and a level two (2) subband triplet (HL2, HH2 and LH2) represent another yet higher resolution. Thus, the collection of subbands, from the DC subband to the LH1 subband represents the highest resolution (or full size) of the digital image in the frequency domain.

Each coefficient in a subband block corresponds to a spatially contiguous group of pixels in a digital image. A coefficient represents a content group of pixels in the spatial domain for a range of frequencies determined by the subband in which the coefficient is located. For example, each coefficient in a level one (1) subband approximately corresponds to a 2×2 groups of pixels of an image, each coefficient in a level two (2) subband approximately corresponds to a 4×4 group of pixels of the image and each coefficient in a level three (3) subband approximately corresponds to an 8×8 group of pixels of the image. In general, a coefficient at level-j subband approximately corresponds to $2^j \times 2^j$ groups of pixel values of an image. A degree of approximation in the correspondence between a coefficient in a frequency domain and a group of pixels in a spatial domain depends upon a basis set chosen for the DWT. For example, if a Haar basis set is used for the DWT (ie. Haar Transform) an exact reconstruction (or synthesis) of a group of pixels from corresponding coefficient, in the frequency domain, is possible.

In addition to the subband decomposition of an image, the decomposition step 103, of FIG. 1, performs a partitioning of each subband into a plurality of non-overlapping tiles. Preferably, each subband comprises an equal number of tiles and each tile contains one or more coefficients of the corresponding subband. Thus, for example, a tile in a DC subband block represents a portion of the digital image at a lowest resolution. Alternatively, tiles can be chosen to be of constant size. That is containing the same number of coefficients per tile without departing from the scope and spirit of the present invention.

An advantage of tiling the subband blocks is that a localised portion of an image can be synthesised (reconstructed) without reconstructing the entire image. As described hereinafter, each tile or group of tiles is/are entropy encoded to achieve a compression of the image. Thus, entropy decoding predetermined ones of the tiles and synthesising the tiles through an inverse DWT will result in a reconstruction of a predetermined localised portion of the image.

The relative size of a tile (eg. a quarter of the size of a subband) is predetermined and is typically constrained by a trade-off between compression efficiency, which requires a large tile, and accuracy in localising a reconstruction of a portion of the image, which necessitates a smallest possible tile size. In practice, a compromise between compression efficiency and localisation of reconstruction is determined for a specified application of the encoding process of FIG. 1.

An alternate approach to tiling an image in its corresponding frequency domain is to identify regions of pixels in a spatial domain of the image, which when a transformation (i.e. DWT) is applied to each of the regions corresponds to a tiling of the frequency domain. In effect, a spatial domain of the image is conceptually divided into a plurality of regions, which upon application of a predetermined linear transform, results in a tiling of the corresponding frequency domain of the image.

Figure 3:
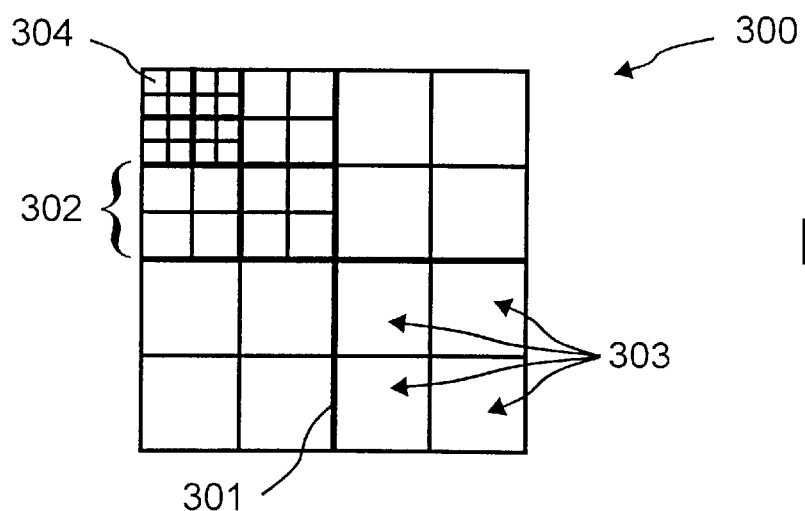
FIG. 3 is a representation of a tiling of the code representation in FIG. 2.

Referring to FIG. 3, there is shown a frequency domain representation 300 of a 128×128 pixel image. The frequency domain representation comprises an array of 128×128 coefficients partitioned 301 (shown in FIG. 3 by heavy set lines) into subbands 302 in accordance with FIG. 2. Each subband is further partitioned or tiled into four equal non overlapping tiles 303.

Figure 4:
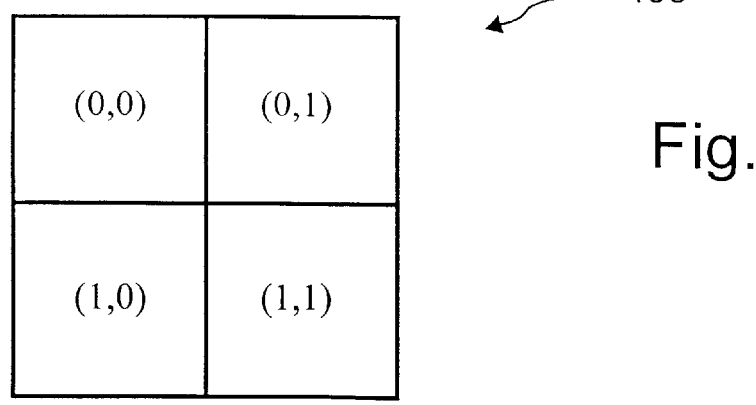
FIG. 4 is a diagram illustrating the ordering of tile shown in FIG. 3.

Referring to FIG. 4, a labelling scheme is presented for each tile in each subband 302. In the labelling scheme a tile in each subband labelled by an ordered pair (m,n) as follows: a top left corner tile is labelled tile (0,0); a top right corner tile is labelled by the ordered pair (0,1); a bottom left corner tile is labelled (1,0); and a bottom right corner tile is labelled (1,1).

Thus, in accordance with the labelling of the subbands of FIG. 2 and the tile labelling scheme of FIG. 4, a tile in FIG. 3 is identified both by its subband label and its tile label. For example, with reference to FIG. 3, tile 304 is identified as DC(0,0) since the tile 304 resides in the DC subband and is the top left tile of the subband.

Referring again to FIG. 1, a next step in encoding process 100, after the decomposition step 103, is the DC coding step 104 which entropy encodes each tile of the DC subband block into a bit stream. Preferably, the tiles 303 in each subband block is entropy encoded into the bit stream in raster order. For example, each tile of the DC subband is entropy encoded and added to the bit stream in the following order: DC(0,0), DC(0,1), DC(1,0) and DC(1,1). Whilst the embodiments the present invention are described with reference to this raster order of the coefficients of each tile into a bit stream, it will be appreciated by those skilled in the art that a different ordering scheme of the coefficients in each tile into a bit stream can be adopted without departing from the spirit and scope of the invention. For example an interleaving of bits in a binary representation of each coefficient of in each tile (or tile triplet as hereinafter described) can be adopted provided a decoder and the corresponding encoder conform to the same ordering scheme.

The entropy encoding and decoding processes used in the preferred embodiment of the present invention is described in more detail in the sections herein entitled "Entropy Encoding Process of the Preferred Embodiment" and "Entropy Decoding Process of the Preferred Embodiment" respectively. However, other entropy encoding (decoding) methods may be used to encode (decode) coefficients in each tile without departing from the scope and spirit of the invention. For example, a Huffman or Arithmetic encoding (decoding) method can be used to encode (decode) coefficients in each tile.

A next step in the flow diagram of FIG. 1 is to initialise 105 a level count variable "levelNum" to a value of three (3) corresponding to the number of levels of the DWT.

Next, a tile count variable herein referred to as "tileNum" is initialised 106 to zero (0). Variable levelNum and tileNum are loop variables which allow the encoding process of FIG. 1 to count down through each tile of the AC subbands (i.e. all subbands other than the DC subband which has been previously entropy coded into the bitstream). The tile count variable "tileNum" is incremented 107 at a next step in the flow diagram, which is then followed by three steps: entropy encode HL subband step 108; entropy encode LH subband step 109; and entropy encode HH subband step 110. The entropy encode HL subband step 108 perform an entropy encoding of a current tile, indicated tileNum, of a current resolution level, indicated by levelNum, into the bit stream. In a substantially similar manner, steps 109 and 110 entropy encode into the bit stream the current tile of the current level of subband LH and HH respectively.

In decision step 111, a check is made to determine if the current tile is the last tile of the current level. If decision step 111 return false (no) the processing is looped 112 back to the increment "tileNum" step 107 and the processing of steps 107, 108, 109, 110 and 111 is repeated substantially as hereinbefore described with a new current tile. Otherwise, if decision step 111 returns true (yes) processing continues to step 113 where the variable levelNum is decremented.

In decision step 114, a check is made to determine if the current level is a last level processed, that is, levelNum equals zero (0). If the decision step 114 returns false (no) the encoding process of FIG. 1 is looped back initialise levelNum to zero (0) at step 106, and steps 107 to 114 substantially as hereinbefore described are repeated for a new current level (i.e. the decremented levelNum). Otherwise, decision step 114 returns true (yes), the process 100 ends at step 115 having produced a bit stream encoded in accordance with the preferred embodiment.

The bit stream resulting from the encoding process 100, described with reference to FIG. 1, can be represented as follows:

DC(0,0), DC(0,1), DC(1,0), DC(1,1), HL3(0,0), LH3(0,0) HH3(0,0), HL3(0,1), LH3(0,1), HH3(0,1), HL3(1,0), LH3(1,0), HH3(1,0), HL3(1,1), LH3(1,1), HH3(1,1) . . . HL1(1,1), LH1(1,1) HH1(1,1).

The header information is not shown in the foregoing expression.

As previously described with reference to FIG. 1, each tile (e.g. DC(0,0) in the foregoing expression is individually entropy encoded. However, in practice it may be desirable to entropy encode a group of tiles together thus attaining a better overall compression factor by entropy encoding a larger group of coefficients while practically maintaining a substantially similar localisation accuracy in reconstructing a desired portion of an image. For example in practice it is likely that if HL3(0,0) is to be entropy decoded, to obtain pixel values of an image portion, then so do tiles LH3(0,0) and HH3(0,0) since these tiles relate to the same image portion. Thus, preferably, a corresponding tile for each AC subband block triplet (HL, LH and HH) can be entropy encoded as a single unit. This single unit is referred to hereinafter as a "tile triplet" (e.g. HL3(0,0), LH3(0,0) and HH3(0,0) is one such tile triplet).

Figure 5:
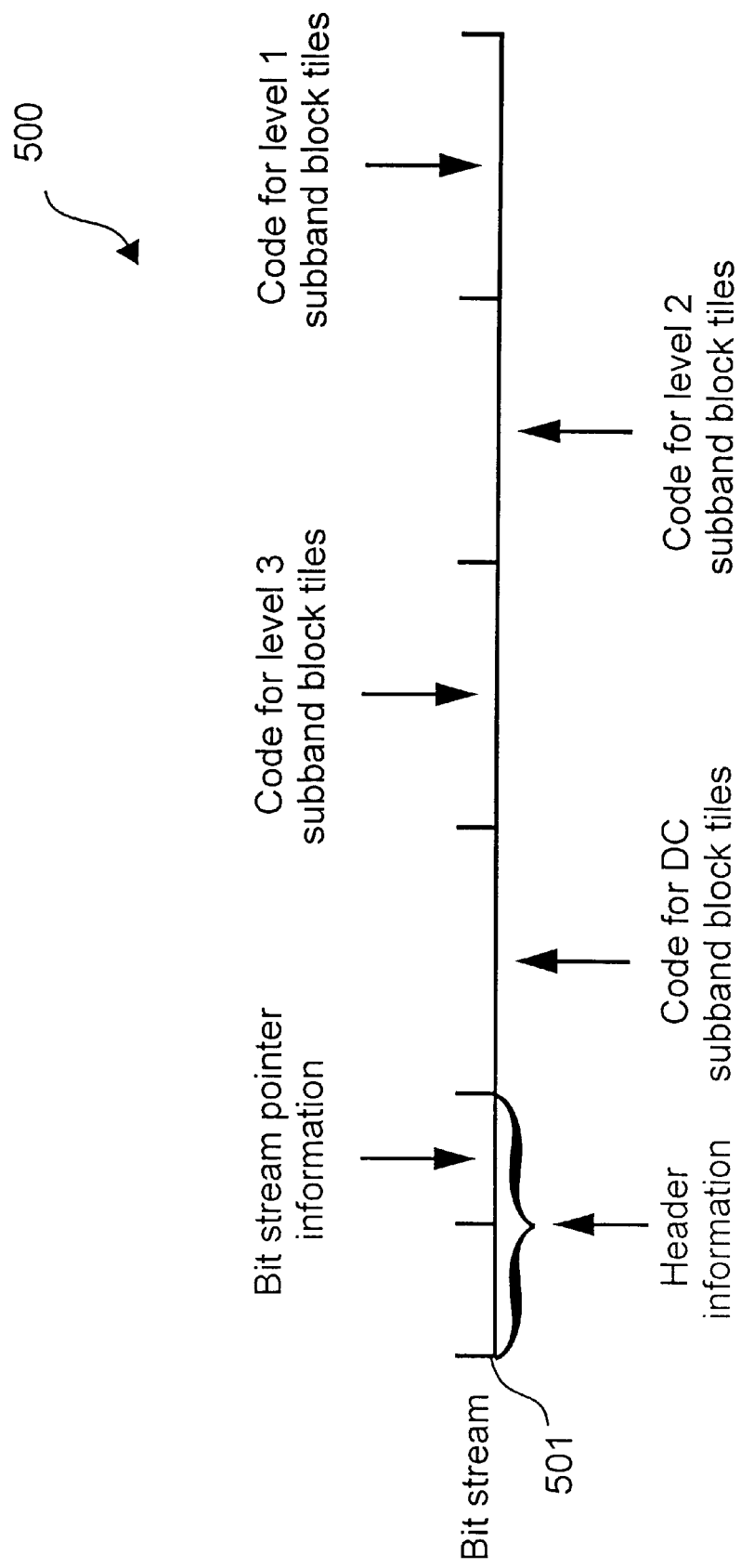
FIG. 5 is a representation of the bit stream accordance with a preferred embodiment of the invention.

Referring to FIG. 5, there is shown a line graph 500 representing substantially an entire bit stream. Header information at the beginning 501 of the bit stream, may include information on; the size of the bit stream; a compression quality parameter; and a compression factor value. The head information also includes a plurality of bit stream pointer information to allow a substantially random access of the encoded tiles. For example, the pointer information may comprise a pointer to a starting position of each tile in a DC subband and a pointer to a starting position of each tile triplet. Alternately, the pointer information may include a pointer to the starting position of each tile in the bit stream. Preferably, the pointer information is the number of bits per tile or tile triplet which ever is entropy encoded as a single unit. Alternately, the pointer information is the number of bytes per tile or tile triplet, where the tile or tile triplet code is padded so as to be a whole number of bytes. Such pointer information is not necessarily an absolute address, but can be a relative address to the starting position of each tile or tile triplet.

Preferably, if a tile (or tile triplet) consists entirely of zero coefficients, then a is zero (0) can be recorded as a corresponding relative pointer to the tile (or tile triplet) and no bits are needed in the bit stream for the tile, since it can be determined, from the corresponding pointer information (i.e. zero) and a neighbouring tile size, how many coefficients are zero (0). This preferred feature provides additional compression to a bit stream where it is determined that a tile or plurality of tiles consist entirely of zero coefficients.

The entropy encoded tiles for the DC subband is sequentially arranged in the bit stream 500, followed by entropy encoded tiles for level 3 subbands, level 2 subbands and level 1 subbands as previously described with reference to FIGS. 1–4. An entropy encoded tile (or tile triplet) may require a corresponding tile header information (not shown in FIG. 5) which is used for an entropy encoding or decoding of the tile or tile triplet. For example, for the entropy encoding/decoding method of the preferred embodiment, a maximum bit number "maxbitNumber" indicating a maximum bit plane is required for an entropy encoding/decoding of an array of coefficients. Thus, for example to entropy encode/decode a tile using the entropy encoding/decoding method of the preferred embodiment the tile requires an associated corresponding tile header information which includes a maxbitNumber for the tile.

Hereinafter the term tile and tile triplet are used interchangeably, particularly when referring to entropy encoding or decoding, since the entropy encoding or decoding of a tile triplet is performed, preferably, on a tile by tile basis excepting that a maxbitNumber is determined from the magnitude of largest coefficient in the tile triplet.

Preferably, tile header information is arranged in the bit stream 500 at the start of each corresponding tile, and is independently encoded from the coefficients of each tile. Typically, the tile header information is entropy encoded by a different entropy coding technique to that used for the coefficient in each tile. For example, Huffman encoding can be used for the tile header information, where the coefficients of the corresponding tile are entropy encoded using the entropy coding method of the preferred embodiment.

Figure 6:
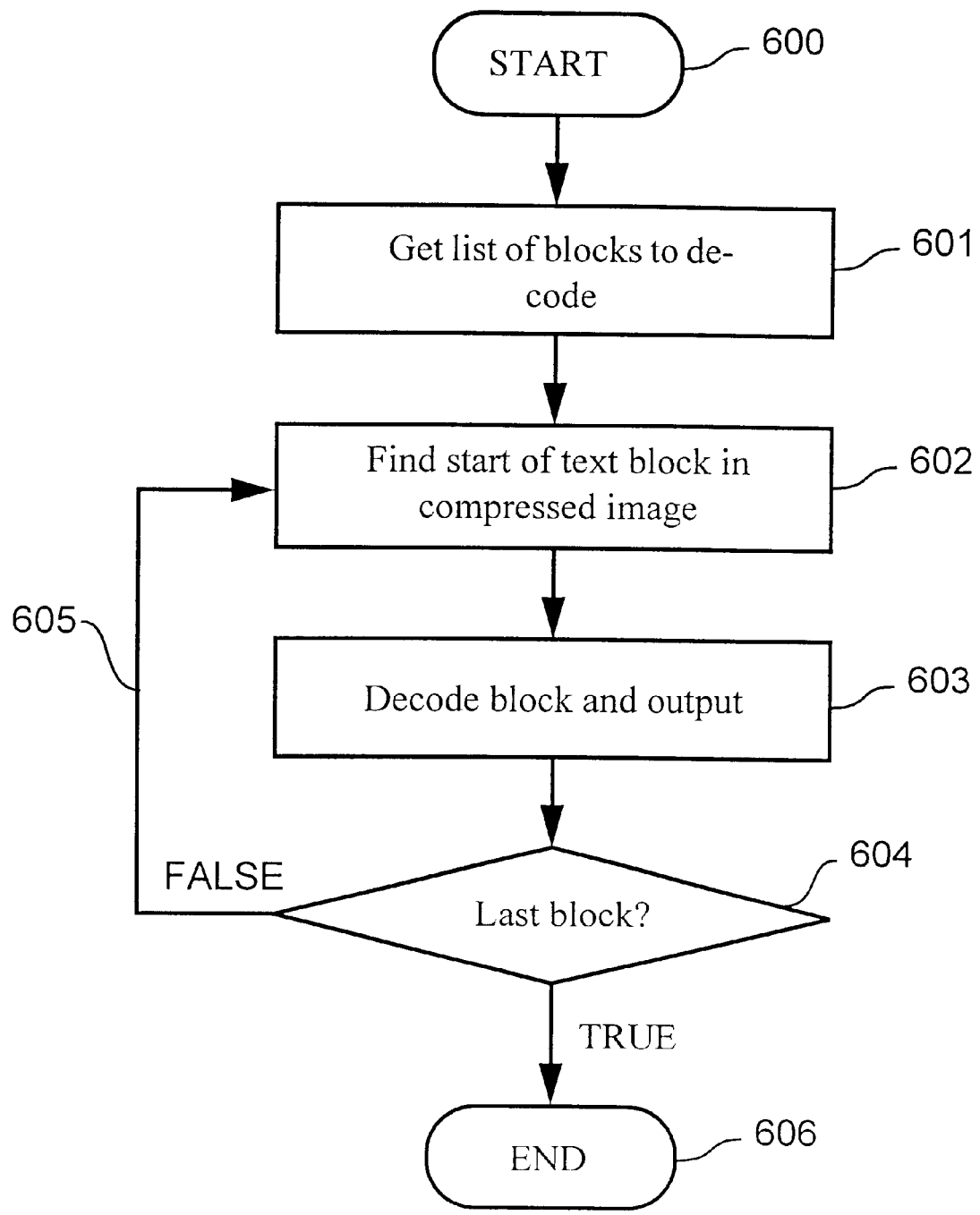
FIG. 6 is a block diagram of a decoding process in accordance with a preferred embodiment of the invention

Referring to FIG. 6, there is shown a flow diagram for decoding a predetermined portion of an image from a compressed image 500 (bit stream) encoded in accordance with the preferred embodiment of the present invention. In an initial step 600 a region of an image which is desired from the compressed image 500 (bit stream) and a resolution (or size) of the region is selected.

Processing continues on a next step 601 where a determination is made as to the number of tiles and which of the tiles encoded into the bit stream 500 are to be decoded to obtain the region of the image selected in the previous step 600. Preferably the number of tiles decoded from the bit stream 500 is such that a region obtained form the tiles at least encompasses the selected region.

At the next step 602, the pointer information in the header of the bit stream 500 is used to find the tiles in the bit stream 500 to be decoded. As each desired tile is found in the bit stream 500 the tile is passed to a decoding step 603. The decoding step 603 first decodes the tile header information for a tile and uses the information (i.e. maxbitNumber) to entropy decode the tile. The tile is entropy decoded and outputed.

In a decision step 604, a check is made to determine if a current tile is the last tile of those determined in a previous step 601. If the decision step 604 returns false (no) the flow diagram of FIG. 6 is looped 605 back to step 602 and steps 602 to 604, as hereinbefore described, are repeated. Otherwise, if the decision step 604 returns true (yes) the decoding process of the preferred embodiment ends at step 606 having decoded the desired number of tiles and outputed.

The decoded tiles are typically outputed to a memory unit and a subband synthesis (ie inverse DWT) is performed before display on a video display device.

Entropy Encoding Process of Preferred Embodiment

Before proceeding with a further description of the embodiment, a brief review of terminology used hereinafter is provided. For a binary integer representation of a number, "bit n" or "bit number n" refers to the binary digit n places to the left of the least significant bit (beginning with bit 0). For example, assuming an 8-bit binary representation, the decimal number 9 is represented as 00001001. In this number, bit 3 is equal to 1, while bits 2, 1, and 0 are equal to 0, 0, and 1, respectively. In addition, a transform may be represented as a matrix having coefficients arranged in rows and columns, with each coefficient represented by a bit sequence. Conceptually speaking the matrix may be regarded as having three dimensions; one dimension in the row direction; a second dimension in the column direction and a third dimension in the bit sequence direction. A plane in this three dimensional space which passes through each bit sequence at the same bitnumber is refereed to as a "bitplane" or "bit plane".

For transform coding applications, the number of bits per coefficient required to represent the possible range of coefficients is determined by the linear transform and the resolution of each pixel (in bits per pixel) in the input image. This range of values for each pixel is typically large relative to the values of most of the transform coefficients, and thus many coefficients have a large number of leading zeros. For example, the number 9 has four leading zeros in an 8-bit representation and has 12 leading zeros in a 16-bit representation. The embodiments of the invention provide a method and apparatus of representing (or coding) these leading zeros, for blocks of coefficients, in an efficient manner. The remaining bits and sign of the number are encoded directly without modification.

To simplify the description and not to obscure unnecessarily the invention, the transform coefficients are assumed hereinafter to be represented in an unsigned binary integer form, with a single sign bit. That is, the decimal numbers −9 and 9 are represented with the same bit sequence, namely 1001, with the former having a sign bit equal to 1 to indicate a negative value, and the latter having a sign bit equal to 0 to indicate a positive value. The number of leading zeros is determined by the range of the transform coefficients. In using an integer representation, the coefficients are implicitly already quantised to the nearest integer value, although this is not necessary for the embodiment of the invention. Further, for the purpose of compression, any information contained in fractional bits is normally ignored.

A tile consists of a set of contiguous image coefficients. The term coefficient is used hereinafter interchangeably with pixel, however, as will be well understood by a person skilled in the art, the former is typically used to refer to pixels in a transform domain (eg., a DWT domain).

Figure 7:
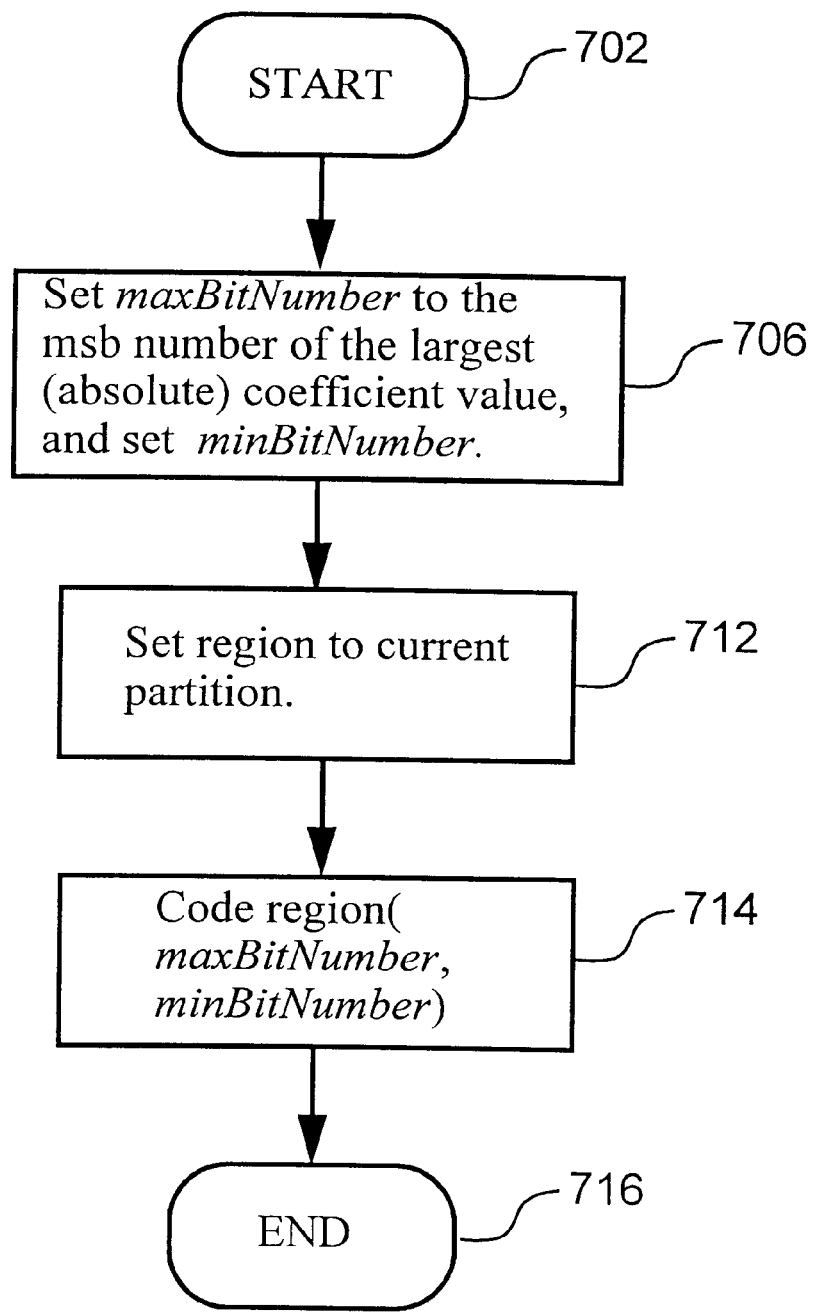
FIG. 7 is a flow diagram illustrating the method of representing, or encoding, an image according to the preferred embodiment.

FIG. 7 is a flow diagram illustrating the entropy encoding method according to the preferred embodiment. In step 702, processing commences using a tile. In step 706, the most significant bit (msb) of the largest absolute value of the transform coefficients is determined from the tile header information and a parameter, maxBitNumber, is set to this coefficient value. For example, if the largest transform coefficient has a binary value of 00001001 (decimal 9), the parameter maxBitNumber is set to 3, since the msb is bit number 3. Alternatively, the parameter maxBitNumber may be set to be any value that is larger that the msb of the largest absolute value of the transform coefficients. For a tile triplet each tile in the triplet is entropy encoded separately, however a maxBitNumber for the tile triplet is used. In effect the use of a common maxBitNumber associates each tile in triplet with the tile triplet, since the three tile in the tile triplet are then decoded together. Each tile can be processed separately, setting each initial region to the whole tile in question.

Further, in step 706, a coding parameter, minBitNumber is set to specify the coded image quality. In particular, this coding parameter specifies the precision of every coefficient in the transformed image and can be varied as required. For example, a minBitNumber of 3 provides a coarser reproduction of the original image than does a value of 1.

The minBitNumber parameter is typically stored in the header information of the bit stream 500 and defines the compression quality of the entire image.

Beginning in step 712, each tile is coded by setting an initial region as the whole tile. In step 714, the region is encoded with the maxBitNumber and minBitNumber as parameters. Processing terminates in step 716.

Figure 8:
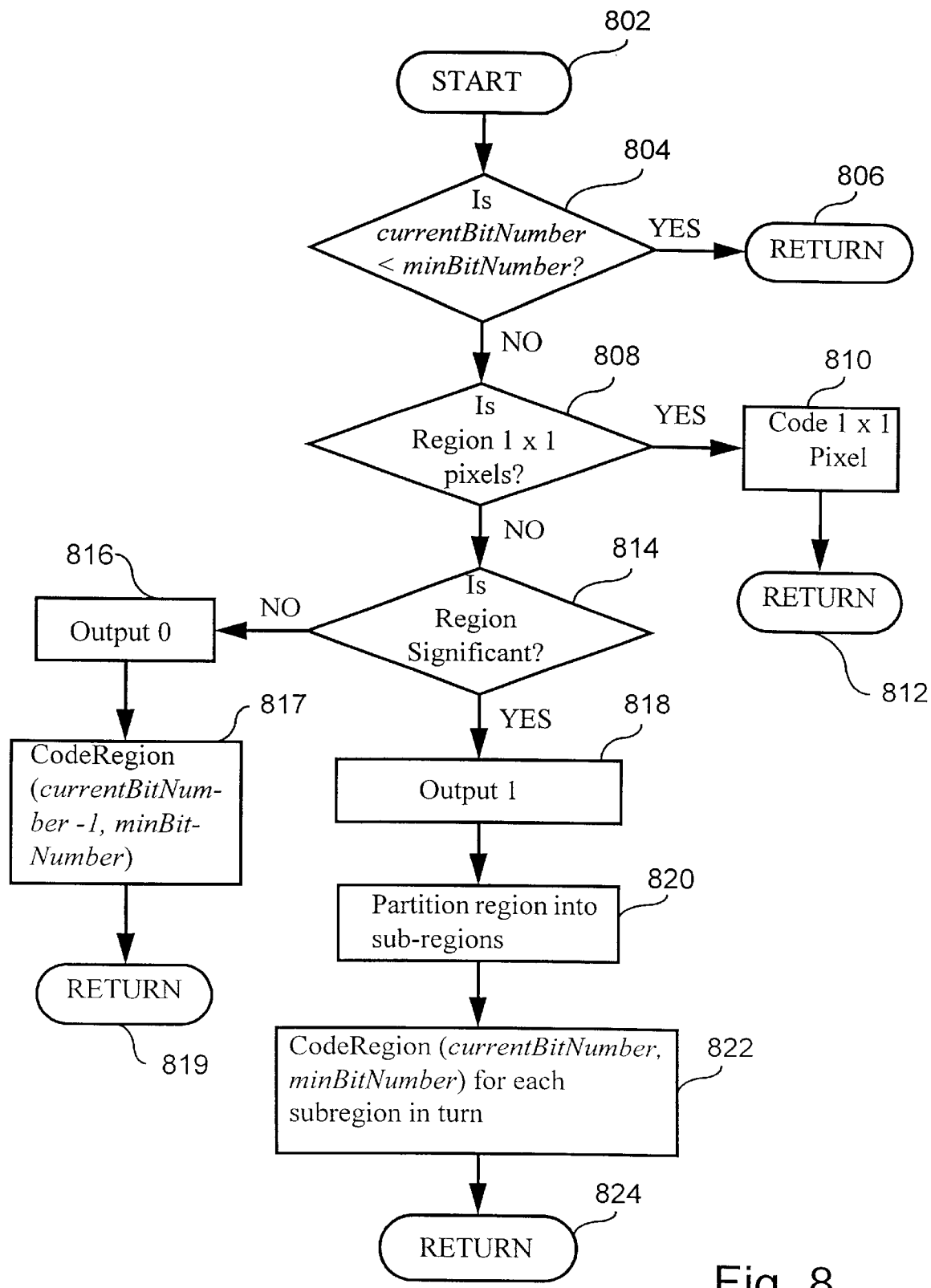
FIG. 8 is a detailed flow diagram illustrating the step of coding a region in FIG. 7.

FIG. 8 is a detailed flow diagram of the procedure "Code region(currentBitNumber, minBitNumber)" called in step 714 of FIG. 7 for coding each region, where maxBitNumber is provided as the currentBitNumber. In step 802, processing commences. The inputs to the region coding process of FIG. 8 include the currentBitNumber and minBitNumber parameters. Preferably, the method is implemented as a recursive technique where the process is able to call itself with a selected region or sub-region. However, the process may implemented in a non-recursive manner without departing from the scope and spirit of the invention.

In decision block 804, a check is made to determine if the currentBitNumber parameter is less than the minBitNumber parameter. If decision block 804 returns true (yes), nothing is done and processing returns to the calling procedure (or parent process) in step 806. This condition indicates that every coefficient in the selected region has a msb number less than minBitNumber. Otherwise, if decision block 804 returns false (no), processing continues at decision block 808.

In decision block 808, a check is made to determine if the selected region is a 1×1 pixel. While this embodiment is described with a predetermined size of 1×1 pixels, it will be apparent to one skilled in the art that different sizes may be practised without departing from the scope and spirit of the invention. The predetermined size can be M×N pixels, where both M and N are positive integers. For example, the predetermined size may be less than or equal to 2×2 pixels or coefficients. If decision block 808 returns true (yes), processing continues at step 810. In step 810, the 1×1 pixel is coded. Again, it will be apparent to one skilled in the art that different predetermined sizes (M×N pixels) may be practiced. Still further, the predetermined size may be less than or equal to 2×2 pixels or coefficients. Preferably, this step 810 involves directly outputting the remaining bits above the minBitNumber in the coded representation. In step 812, processing returns to the calling procedure. Otherwise, if decision block 808 returns false (no), the region consists of more than one coefficient and processing continues at decision block 814.

In decision block 814, the selected region is checked to determine if it is significant. That is, the significance of the region is tested. The region is said to be insignificant if the msb number of each coefficient in the region is less than the value of the currentBitNumber parameter. To make the concept of region significance precise, a mathematical definition is given in Equation (1). At a given bit number, say currentBitNumber=n, the region is said to be insignificant if:

$$|c_{ij}| < 2^n, \forall i,j \in R, \qquad (1)$$

where R denotes the region, and $c_{ij}$ denotes coefficient (i,j) in this region.

If decision block 814 returns false (no), processing continues at step 816. In step 816, a value of 0 (or first token) is output in the coded representation stream, and a recursive call is made in step 817 to the subroutine CodeRegion (currentBitNumber−1,minBitNumber) where currentBitNumber has been decremented by 1. That is, the next, lower bitplane of the region is selected for processing. Processing then continues at decision block 804, where the region is again processed with the parameters currentBitNumber−1 and minBitNumber. Otherwise, if decision block 814 returns true (yes), that is, the region is significant, processing continues at step 818. Alternatively, to reduce the number of recursive function calls, the step 814 may be replace by a step that outputs currentBitNumber−n zeros, where n is the largest integer for which the region is significant. If n is not less than minBitNumber, the processing goes to step 818. Otherwise the function terminates.

In step 818, a value of 1 (or second token) is output in the coded representation stream. In step 820, the selected region is partitioned into a predetermined number (preferably, 4) of subregions using a specified partitioning algorithm or process. The partitioning process used is known to the decoder.

In this embodiment of the invention, square regions are used and each square region is partitioned in a quad tree type fashion. That is, a region is partitioned preferably into 4 equal-sized (square) subregions. A subregion is then recursively selected and partitioned again into 4 equal-sized (square) subregion. The selection of a subregion for recursive partitioning substantially depends upon the values of the coeffecients in the subregion and the recursion stops when a desired sized subregion is reached or all the coefficient in a subregion are zero (0). This quad tree type partitioning is not always possible depending on the size and shape of the initial region. If this is not possible, the initial region can be partitioned into a number of square regions, each having dimensions that are a power of 2, and these partitions can be encoded separately. In any case, this initialisation has minimal effect on the overall results if done in an intelligent fashion. In an alternate embodiment, a different partition may be used that is suitable for a block-based coder.

In step 822, each subregion is then coded with the same currentBitNumber and minBitNumber parameters. This is preferably done by means of a recursive call to the procedure "Code region(currentBitNumber, minBitNumber)" of FIG. 8. This coding of subregions may be implemented in parallel or sequentially.

In the coded representation, a transform coefficient is coded by simply outputting the pixel bits from the currentBitNumber to the minBitNumber. Preferably, a convention is followed whereby the sign is output only if some of the coefficient bits are non-zero. For example, if currentBitNumber=3, minBitNumber=1, then −9 (00001001) is coded as "1 0 0" followed by a sign bit "1".

A Compression Encoding Example

The entropy encoding method of the preferred embodiment effectively codes the leading zeros of most transform coefficients, while coding the bits from the most significant bit to the predetermined least significant bit, specified by the parameter minBitNumber, and the sign simply as is. Thus, the preferred embodiment of the present invention advantageously represents the leading zeros. This method is very efficient in certain situations, namely for coding array coefficients skewed in a predetermined manner, and which typically exhibit a large dynamic range.

A few coefficients typically have very large values, while most have very small values. The magnitude of the coefficients are arranged in the array such that from a largest magnitude coefficients are arranged substantially in descending order of magnitude.

An example of encoding a two-dimensional region comprising 4×4 coefficients is described with reference to FIGS. 11A to 11D. The processing of the 4×4 region 1100 of FIG.

11A is commenced with the maxBitNumber set to 7 since this is the largest bit number (bitplane) of all of the coefficients:

$$\begin{bmatrix} 200 & 13 & -11 & -8 \\ -13 & 3 & -4 & -3 \\ 8 & 1 & -2 & -2 \\ 2 & -1 & -3 & -3 \end{bmatrix}.$$

The minBitNumber is set to 3, for illustrative purposes. A tile header (information) is preferably output in the coded representation containing the maxBitNumber. The process of coding the region 1100 then follows.

At currentBitNumber=7, a one (1) is output since the region 1100 is significant with respect to bit number 7 (see decision block 804, 808, and 814 and step 818 of FIG. 8). The region 1100 is then partitioned into four sub-regions (see step 820 of FIG. 8): the top left region 1110, the top right region 1112, the bottom left region 1114 and the bottom right region 1116 of FIG. 11A. Each of the subregions consist of 2×2 coefficients.

Figures 11A, 11B, 11C, 11D:
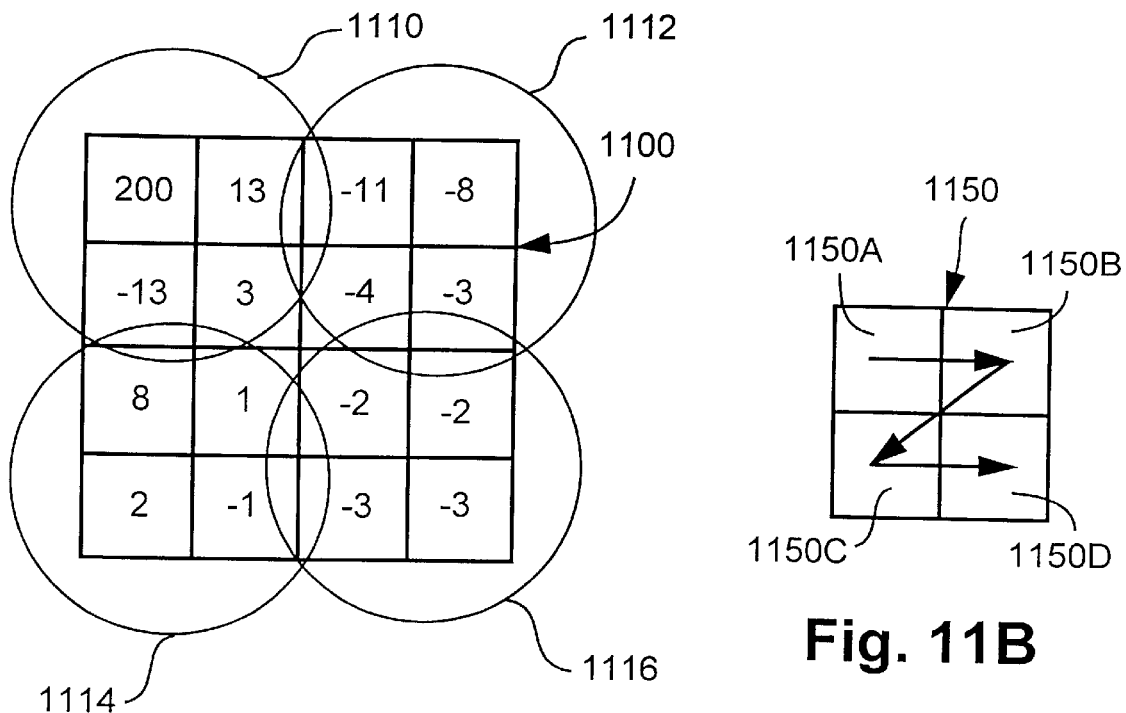
FIGS. 11A to 11D are diagrams illustrating the processing of a two-dimensional, eight-coefficient region in accordance with the encoding and decoding method of FIGS. 7 to 10.

The sub-regions 1110, 1112, 1114 and 1116 of FIG. 11A are in turn coded in the predefined processing sequence shown of FIG. 11B, where a region 1150 consists of four sub-regions 1150A to 1150D. The three arrows illustrated in the diagram indicate the order or sequence of processing, that is, top left sub-region 1150A, top right sub-region 1150B, bottom left sub-region 1150C and bottom right sub-region 1150D, respectively.

The sub-region 1110 of FIG. 11A is coded first (see step 822 of FIG. 8). For the currentBitNumber equal to 7, a one (1) is output in the coded representation. The sub-region 1110 is then partitioned into four 1×1 pixels having decimal values 200, 13, -13 and 3. Each of these coefficients is coded by outputting the bits of each coefficient from the currentBitNumber=7 to the minBitNumber=3 (see decision block 808 and step 810 of FIG. 8). A sign bit is then output if required. Thus, the decimal value is 200 is coded as 11001 followed by the sign bit 0. The coefficient value 13 is coded as 00001 with a sign bit 0. The coefficient value -13 is coded as 00001 with a sign bit 1. Finally, the coefficient value 3 is coded as 00000 (without a sign bit). The coded representation of each coefficient includes the two "1" bits preceding the bits of coefficient "200" between the currentBitNumber and minBitNumber. This completes the coding of the top left sub-region 1110. The coded output at this stage is:

$$\underbrace{111001}_{200}\overbrace{0}^{\text{sign bit}}\underbrace{00001}_{13}0\underbrace{00001}_{-13}1\underbrace{00000}_{3}.$$

The tile header information is not shown in the foregoing expression.

The top right sub-region 1112 is then coded (per FIG. 11B). A zero (0) is output for each of currentBitNumber equal to 7, 6, 5, and 4, since the region 1112 is insignificant with respect to these bit numbers. A one (1) is output at currentBitNumber=3, since this bitplane is significant with respect to bit number 3. The sub-region 1112 is partitioned into the four 1×1 pixels having values -11, -8, -4 and -3. These decimal values are coded as bit value 1 with sign bit 1, bit value 1 with sign bit 1 and bit values 0 and 0 without sign bits, respectively. Thus, at this stage, the coded representation is as follows:

$$1111001000001000001100000000001\underbrace{11}_{-11}\underbrace{11}_{-8}\underbrace{0}_{-4}\underbrace{0}_{-3}$$

The bottom left sub-region 1114 is then encoded. A zero (0) is output for each of currentBitNumber equal to 7, 6, 5, and 4, since the region 1114 is insignificant with respect to these bit numbers. A one (1) is output at currentBitNumber equal to 3, since this bitplane is significant with respect to bit number 3. The sub-region 1114 is then partitioned into four 1×1 pixels having values 8, 1, 2 and -1. These are coded respectively as binary value 1 with sign bit 0, and binary values 0,0 and 0 without sign bits.

Finally, the bottom right sub-region 1116 having values -2, -2, -3, and -3 is coded. A zero (0) is output for each of currentBitNumber=7, 6, 5, 4 and 3 since the sub-region 1116 is insignificant with respect to these bit numbers. No sign bits are output. Thus, the coded representation is as follows:

1111001000001000001100000000011111000000011000 000000.

The entropy decoder simply mimics the entropy encoding process to reconstruct the region from the coded representation as depicted in FIG. 11C.

The decoding process can be made "smarter" in a number of ways. One such "smarter" way is depicted in FIG. 11D. In this case, the magnitude of each of the non-zero coefficients is increased by half of 2 to the power of minBitNumber. This is depicted in FIG. 11D. In this manner, the "smart" decoding processing generally reduces the mean square error between the decoded and the original coefficients. Still further, the encoder can alternatively perform this (type of) operation, thereby leaving the decoder to use the simplest depicted in FIG. 11C.

Entropy Decoding Process of Preferred Embodiment

Figure 9:
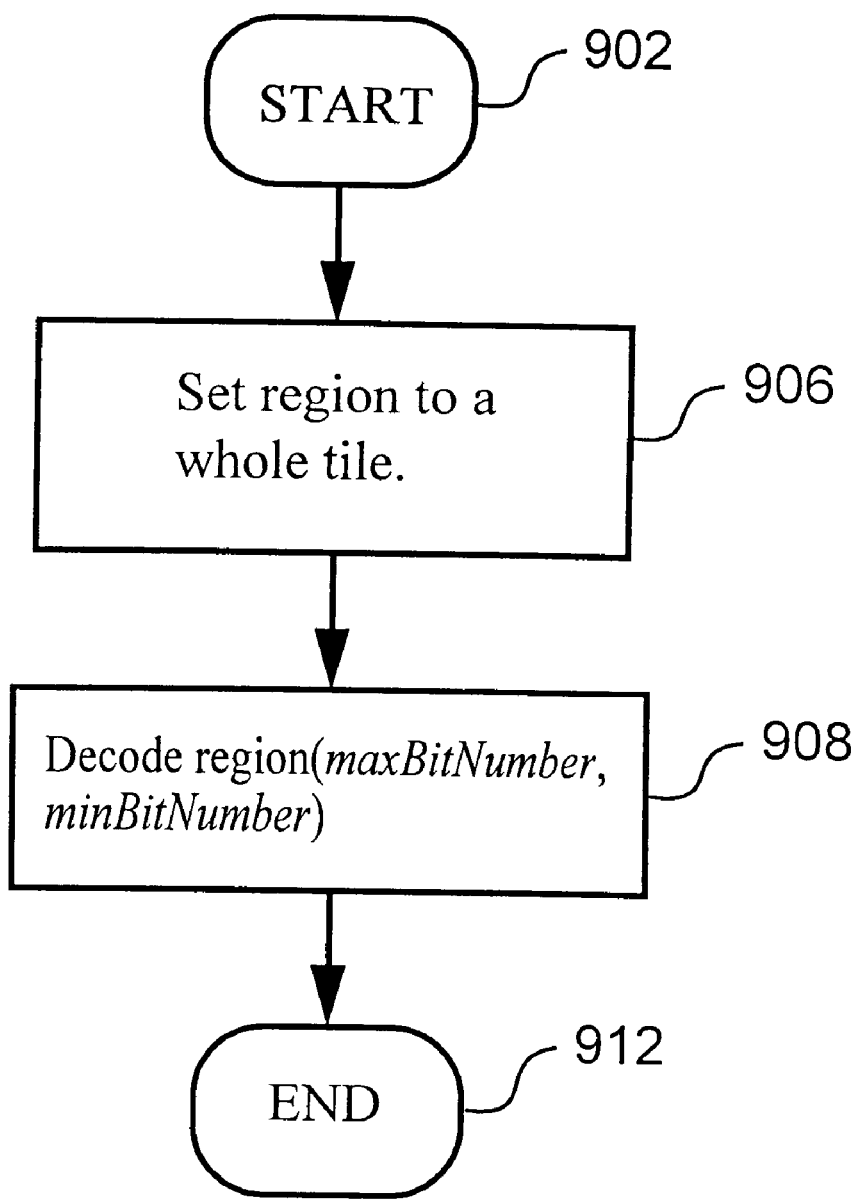
FIG. 9 is a flow diagram illustrating the method of decoding a coded representation of an image produced in accordance with the method of FIG. 7.

FIG. 9 is a flow diagram illustrating a method of decoding tiles entropy encoded with the entropy encoding process of the preferred embodiment. In step 902, processing commences using the coded representation. In step 906, decoding of the selected tiles is commenced by setting the region to the whole selected tile. In step 908, the selected region is decoded using the maxBitNumber and minBitNumber parameters. Processing terminates in step 912.

Figure 10:
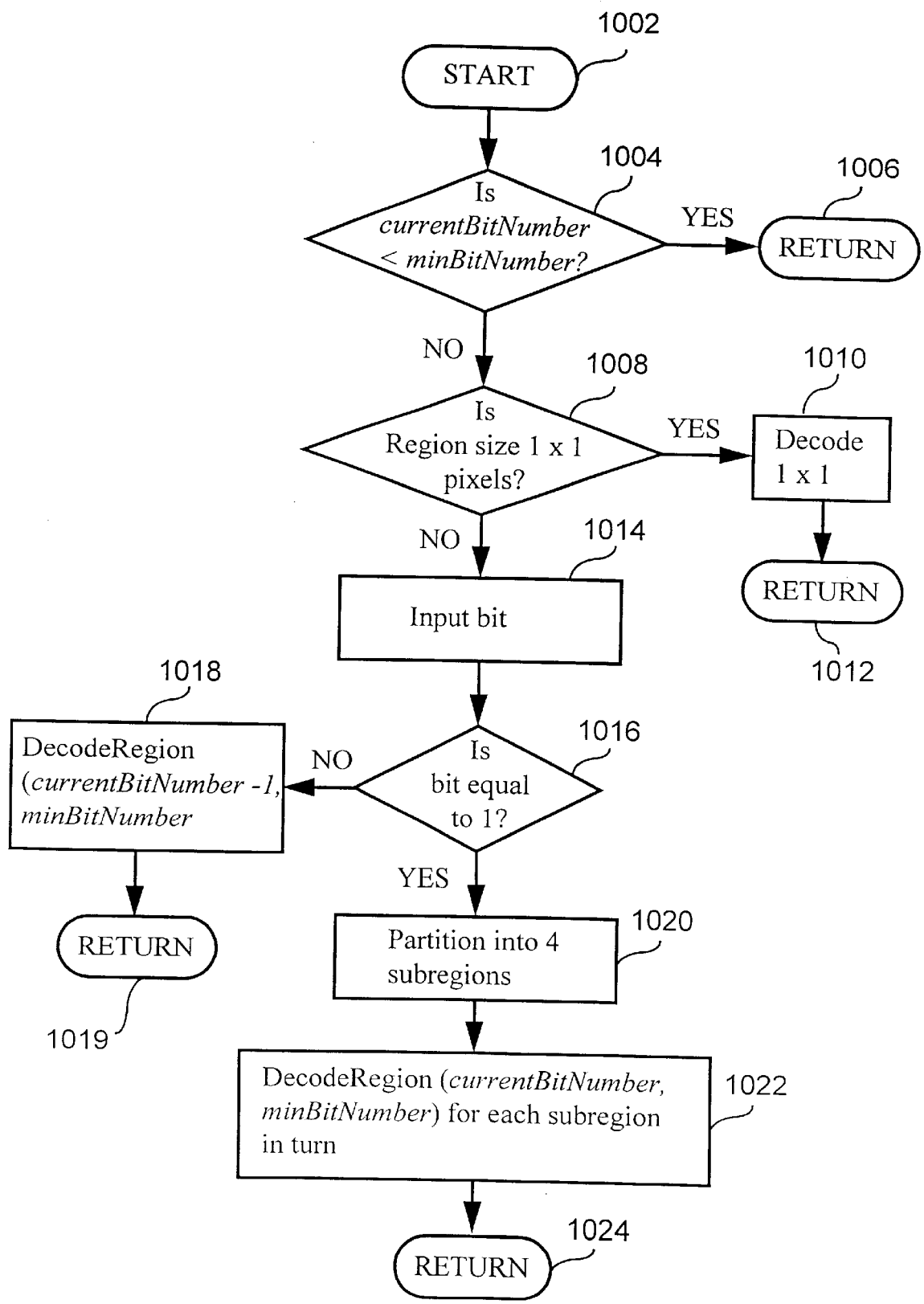
FIG. 10 is a detailed flow diagram illustrating the step of decoding a region in FIG. 9.

FIG. 10 is a detailed flow diagram of step 908 of FIG. 9 for decoding each region using procedure call "Decode region(currentBitNumber, minBitNumber)", where maxBitNumber is provided as the currentBitNumber. In step 1002, processing commences. The inputs to the region decoding process of FIG. 10 are the currentBitNumber and minBitNumber parameters. Again, the method is preferably implemented as a recursive technique. However, the process may be implemented in a non-recursive manner without departing from the scope and spirit of the invention.

In decision block 1004, a check is made to determine if the currentBitNumber is less than the minBitNumber. If decision block 1004 returns true (yes), processing continues at step 1006, where processing returns to the calling procedure. Otherwise, if decision block 1004 returns false (no), processing continues at decision block 908.

In decision block 1008, a check is made to determine if the selected region has a size of 1×1 pixels. If decision block 1008 returns true (yes), processing continues at step 1010. In step 1010, the 1×1 region is decoded. Likewise, the size may be predetermined and be equal to M×N pixels, where both M and N are positive integers. For example, the size may be less than or equal to 2×2 pixels or coefficients. Processing then returns to the calling procedure in step 1012. If decision block 1008 returns false (no), processing continues at step 1014. In step 1014, a bit is input from the coded representation.

In decision block 1016, a check is made to determine if the bit is equal to 1, that is, the input is checked to determine if the region is significant. If decision block 1016 returns false (no), processing continues at step 1018. In step 1018, a recursive call is made to the subroutine DeCodeRegion (currentBitNumber−1,minBitNumber) where currentBitNumber has been decremented by 1, and processing continues at decision block 1004. Otherwise, if decision block 1016 returns true (yes), processing continues at step 1020. In step 1020, the region is partitioned into the predetermined number (preferably, 4) of sub-regions. In step 1022, each of the sub-regions is decoded using the currentBitNumber and minBitNumber. In the preferred embodiment, this is carried out by means of a recursive call to the process illustrated in FIG. 10. In step 1024, processing returns to the calling procedure.

Thus, the bits output from the significance decisions in the encoder instruct the decoder on which path of the process to take, thus mimicking the encoder. The pixels, and possible sign, are decoded by simply reading in the appropriate number of bits (currentBitNumber to minBitNumber and if some of these are non-zero the sign bit).

Figure 12:
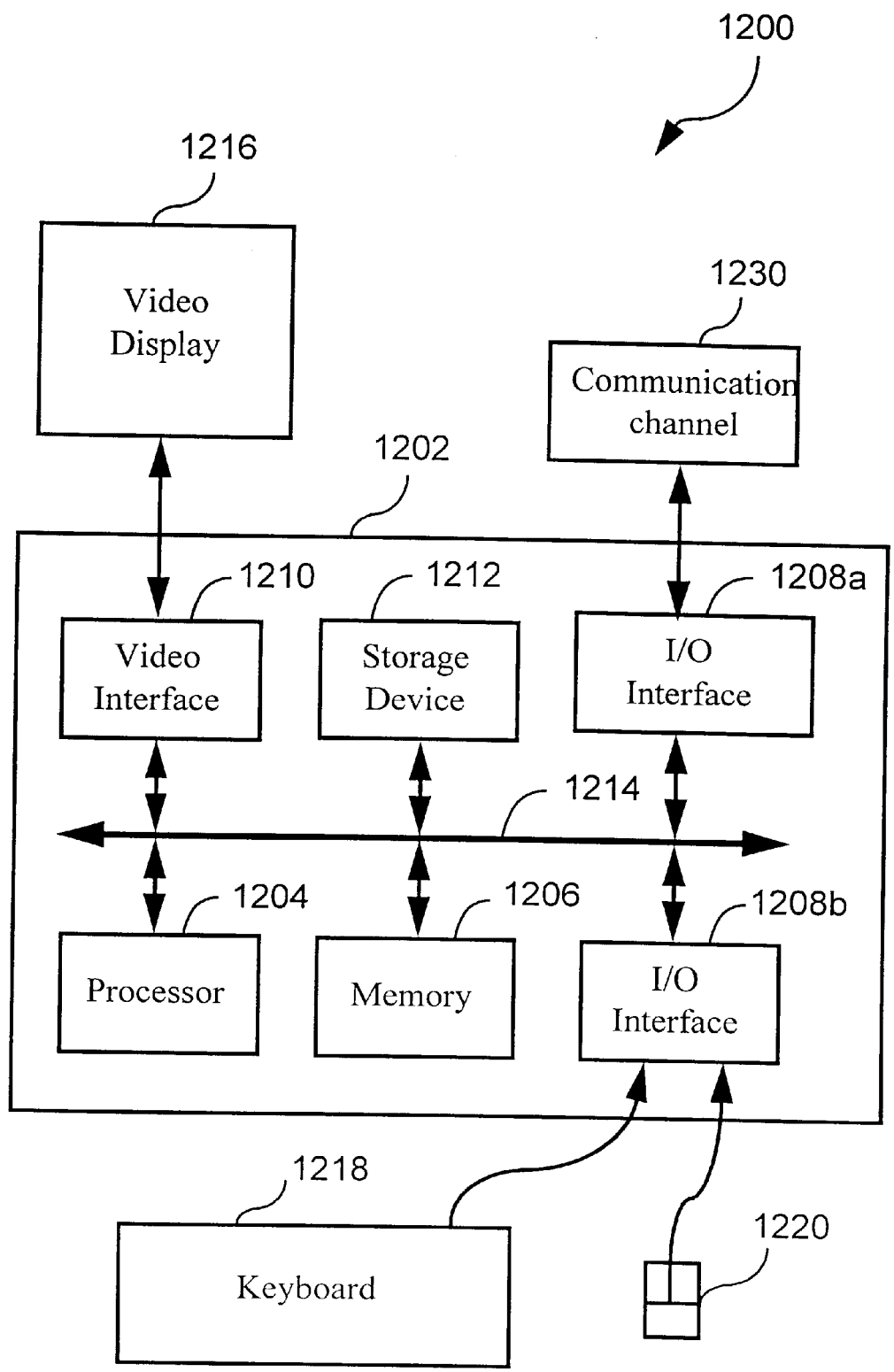
FIG. 12 is a diagram of a computer for implementing the embodiments.

The encoding and decoding processes are preferably practiced using a conventional general-purpose computer, such as the one shown in FIG. 12, wherein the processes described with reference to FIGS. 1 to 11 may be implemented as software executing on the computer. In particular, the steps of the coding and/or decoding methods are effected by instructions in the software that are carried out by the computer. The software may be divided into two separate parts; one part for carrying out the encoding and/or decoding methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding digital images and decoding coded representations of digital images in accordance with the embodiments of the invention. A system may be practiced for coding a digital image and decoding the corresponding coded representation of the image, or vice versa.

The computer system 1200 consists of the computer 1202, a video display 1216, and input devices 1218, 1220. In addition, the computer system 1200 can have any of a number of other output devices including line printers, laser printers, plotters, and other reproduction devices connected to the computer 1202. The computer system 1200 can be connected to one or more other computers via a communication interface 1208c using an appropriate communication channel 1230 such as a modem communications path, a computer network, or the like. The computer network may include a local area network (LAN), a wide area network (WAN), an Intranet, and/or the Internet The computer 1202 itself consists of a central processing unit(s) 1204, a memory 1206 which may include random access memory (RAM) and read-only memory (ROM), input/output (IO) interfaces 1208a, 1208b, a video interface 1210, and one or more storage devices generally represented by a block 1212 in FIG. 12. The storage device(s) 1212 can consist of one or more of the following: a floppy disc, a hard disc drive, a magneto-optical disc drive, CD-ROM, magnetic tape or any other of a number of non-volatile storage devices well known to those skilled in the art. Each of the components 1204 to 1212 is typically connected to one or more of the other devices via a bus 114 that in turn can consist of data, address, and control buses.

The video interface 1210 is connected to the video display 1216 and provides video signals from the computer 1202 for display on the video display 1216. User input to operate the computer 1202 can be provided by one or more input devices. For example, an operator can use the keyboard 1218 and/or a pointing device such as the mouse 1220 to provide input to the computer 1202.

The system 1200 is simply provided for illustrative purposes and other configurations can be employed without departing from the scope and spirit of the invention. Exemplary computers on which the embodiment can be practiced include IBM-PC/ATs or compatibles, one of the Macintosh™ family of PCs, Sun parcstation™, or the like. The foregoing are merely exemplary of the types of computers with which the embodiments of the invention may be practiced. Typically, the processes of the embodiments, described hereinafter, are resident as software or a program recorded on a hard disk drive (generally depicted as block 1212 in FIG. 12) as the computer readable medium, and read and controlled using the processor 104. Intermediate storage of the program and pixel data and any data fetched from the network may be accomplished using the semiconductor memory 1206, possibly in concert with the hard disk drive 1212.

In some instances, the program may be supplied to the user encoded on a CD-ROM or a floppy disk (both generally depicted by block 1212), or alternatively could be read by the user from the network via a modem device connected to the computer, for example. Still further, the software can also be loaded into the computer system 1200 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

The method of coding and/or decoding may alternatively be implemented in dedicated hardware such as one or more integrated circuits performing the functions or sub functions of the encoding and decoding. Such dedicated hardware may include graphic processors, digital signal processors, or one or more microprocessors and associated memories.

In general operation of the system, the user would encode/decode digital images stored on one or more of the computer readable media previosly described. Alternatively, the user may retrieve the digital via the communication channel 1230. In such circumstances, the encoding process may be performed on a remote computer (not shown), whilst the decoding process is performed on the computer 1202.

Alternate Embodiment

An alternate embodiment is decribed substantially as the preferred embodiment excepting that not all the of multiple resolutions provided by a multi-level subband decomposition of the image are coded efficiently into a bit stream, only a predetermined selected number of levels (resolutions) are a chosen for efficient coding in accordance with the embodiments. That is, for example, three of the four resolutions described with reference to FIGS. 2 and 3 are selected as desired resolutions. For instance, if a highest resolution, a second highest resolution and lowest resolution are the only desired resolutions, then with minor modification to the encoding process of FIG. 1, two resolution levels can be combined in the encoding process to provide, efficiently, a single coded resolution. By combining two resolutions in the encoding process described with reference to FIG. 1, the total number of efficiently encoded resolutions is to decreased by one. For combined resolution levels, the effective resolution of the combination is equivalent to the highest resolution in the combination.

In a non-redundant hierarchical representation, to decode one resolution typically requires information of all previous lower resolution levels. Thus, a combination is preferably a combination of two or more adjacent levels of the multiple resolutions. In the present (alternate) embodiment the bit stream, having combined in the bit stream for example level 3 and level 2 subband tile, described with reference to FIG. 3, into a single resolution, can be represented as follows:

DC(0,0), DC(0,1), DC(1,0), DC(1,1), HL3(0,0), LH3(0,0), HH3(0,0), HL2(0,0), LH2(0,0) HH2(0,0), HL3(0,1), LH3(0,1), HH3(0,1), HL2(0,1), LH2(0,1), HH2(0,1), HL3(1,0), LH3(1,0), HH3(1,0), HL2(1,0), LH2(1,0), HH2(1,0), HL3(1,1), LH3(1,1), HH3(1,1) . . . HL1(1,1), LH1(1,1) HH1(1,1).

Again header information is not shown in the foregoing expression.

The bit stream arrangements of the embodiments advantageously provide an efficient access to one or more tiles representing a localised portion of the image at predetermined resolution. However all resolutions provided by a subband decomposition of an image can always be retrieved from the bit streams of the embodiments of the present invention at an added cost, in access time, for unravelling lower resolution levels in a combination of resolution levels as described with reference to the alternate embodiment.

The bit stream arrangements of the embodiments of the present invention are advantageous where a bit stream is stored and read from a storage device having a relatively slow data access time for random accesses.

A further advantage of the bit streams described in the embodiments is that only one pointer access into a bit stream per row of tiles per resolution level at most is required to access a portion of a digital image. An offset can be used to address a tile in a row which can be determined from the pointer and the size (number of coefficients in each tile). Alternatively, a pointer per spatially related tile, sequentially (contiguously) arranged in the bit stream, per (desired) resolution level at most is required.

The embodiments describe a number of examples, but are not seen as an exhaustive set. Those skilled in the art will recognise that a number of bit stream arrangements can be achieved by combining resolutions (subband levels) into a bit stream in an intelligent manner. For example, to achieve efficient access of a portion of an image at only a largest and a smallest resolution in an N-level DWT representation, tiles in subbands which provide resolutions other than the smallest resolution can be combined into a bit stream substantially as described in the alternate embodiment of the present invention.

The foregoing only describes a small number of embodiments of the present invention, however, modifications and/or changes can be made thereto by a person skilled in the art without departing from the scope and spirit of the invention.

I claim:

1. A method of encoding a coded representation of a digital image, wherein the coded representation includes a non-redundant hierarchical code, having one low frequency subband and a plurality of high frequency subbands arranged in levels, which levels combine to represent multiple resolutions of the image, said method including the steps of:
   a) dividing each subband into a plurality of tiles;
   b) entropy encoding each tile;
   c) selecting a plurality of desired resolutions from said multiple resolutions for inclusion in a bitstream; and
   d) arranging encoded tiles into the bitstream such that, for each level between each pair of adjacent selected resolutions, the entropy encoded tiles representing substantially the same portion of the image are contiguous in the bitstream.

2. The method as claimed in claim 1, wherein the coded representation is a multiple level discrete wavelet transform of the digital image.

3. The method as claimed in claim 1, wherein the subbands are arranged in levels of decreasing order.

4. The method as claimed in claim 1, wherein said entropy encoding step further includes a quantization step.

5. The method as claimed in claim 1, wherein each tile comprises a plurality of transform coefficients.

6. The method as claimed in claim 5, wherein the step or steps of arranging tiles further includes arranging transform coefficients into the bitstream in a predetermined order.

7. The method as claimed in claim 6, wherein the predetermined order is a raster order of the coefficients in each tile.

8. The method as claimed in claim 6, wherein the predetermined order is an interleaving of binary bits of the coefficients in each tile.

9. A method of encoding a digital image to provide substantially random access to portions of the image at a plurality of nominated resolutions, said method including the steps of:

applying a linear transform to the image to produce a plurality of transform coefficients in a frequency domain;

grouping the transform coefficients into frequency subbands, each subband representing a range of frequencies of the image, wherein said grouping step is characterized by one low frequency subband and a plurality of high frequency subbands arranged in levels, and wherein each level represents frequency contributions between adjacent nominated resolutions of the image;

dividing each frequency subband into a plurality of tiles, each tile comprising at least one of the transform coefficients;

quantizing and entropy coding each tile; and arranging the encoded tiles into a bitstream such that, for each level, those encoded tiles which substantially correspond to the same portion of the image are contiguous in the bitstream.

10. A method of encoding a digital image into a bitstream to provide substantially random access to portions of the image at a plurality of nominated resolutions, said method including the steps of:

applying a discrete wavelet transform to the image to produce a non-redundant multiple resolution frequency domain representation of the image, the representation comprising one low frequency subband and a plurality of high frequency subbands arranged in levels, wherein each level represents frequency contributions between adjacent resolutions of the image;

dividing each frequency subband into a plurality of tiles;

quantizing and entropy coding each said tile;

nominating desired resolutions of the digital image; and arranging encoded tiles into a bitstream such that, for each level between nominated resolutions, those tiles which substantially correspond to the same portion of the image are contiguous in the bitstream.

11. A method of encoding a digital image including the steps of:

applying a linear transform to the image to produce a non-redundant multiple resolution frequency domain representation of the image, the representation comprising a plurality of levels, wherein each level represents frequency contributions between adjacent resolutions of the image;

dividing the non-redundant multiple resolution frequency domain representation into a plurality of tiles;

quantizing and entropy coding each tile;

nominating desired resolutions of the digital image; and arranging in a contiguous manner, for each level between nominated resolutions, those tiles which substantially correspond to the same portion of the image.

12. A method of encoding a coded representation of a digital image, wherein the coded representation includes a non-redundant hierarchical code, having one low frequency subband and a plurality of high frequency subbands arranged in levels, which levels combine to represent multiple resolutions of the image, said method including the steps of:

a) dividing each subband into a plurality of tiles;

b) selecting a predetermined number of the levels from the multiple resolutions;

c) entropy encoding each tile;

d) processing the selected levels in a predetermined sequential order; and e) arranging in a contiguous manner, for each level in the sequence to a current level not processed in step d), each entropy encoded tile representing substantially the same portion of image into a bitstream.

13. A method of encoding a digital image into a bitstream, said method including the steps of:

applying a discrete wavelet transform to the image to produce a non-redundant multiple resolution frequency domain representation of the image, the representation comprising one low frequency subband and a plurality of high frequency subbands arranged in levels, wherein each level represents frequency contributions between adjacent resolutions of the image;

dividing each frequency subband into a plurality of tiles;

quantizing and entropy coding each tile;

arranging into the bitstream in a predetermined order each entropy tile of a DC subband; and arranging in a contiguous manner each set of three encoded tiles belonging to each of three AC subbands respectively, which substantially correspond to the same portion of the image at each level, into the bitstream.

14. A method of encoding a digital image into a bitstream, said method including the steps of:

applying a discrete wavelet transform to the image to produce a non-redundant multiple resolution frequency domain representation of the image, the representation comprising a DC subband and a plurality of AC subbands arranged in a hierarchical structure having a plurality of levels, wherein each level represents frequency contributions between adjacent resolutions of the image;

dividing each frequency subband into a plurality of tiles;

grouping each tile, substantially corresponding to a same portion of the digital image, at each level of the AC subbands into tile triplets;

entropy coding each tile of a DC subband and each tile triplet of the AC subbands;

arranging in a predetermined order each entropy encoded tile of a DC subband and each entropy encoded tile triplet into the bitstream.

15. The method as claimed in claim 14, wherein the levels are arranged in a hierarchical structure comprising the DC subband and the AC subbands, which AC subbands are arranged in decreasing level order substantially according to their increasing subband frequency.

16. The method as claimed in claim 15, wherein said arranging step of arranging tiles of the AC subbands is further performed in decreasing level order.

17. A method of encoding a sequential stream of data for providing substantially random access to portions of an image at a plurality of predetermined resolutions, the stream including a non-redundant multiple resolution frequency domain representation of the image, the representation comprising one low frequency subband and a plurality of high frequency subbands arranged in levels, wherein each subband is divided into a plurality of tiles and each level represents frequency contributions between adjacent resolutions of the image, and wherein each tile represents a frequency contribution to a portion of the image at a predetermined resolution, said method including:

inserting at most one pointer in the sequential stream for each set of tiles which correspond to substantially a same spatial portion of the image for each level to access a portion of the digital image.

18. An apparatus for encoding a coded representation of a digital image, wherein the coded representation includes a non-redundant hierarchical code, having one low frequency subband and a plurality of high frequency subbands arranged in levels, which levels combine to represent multiple resolutions of the image, said apparatus including:

means for dividing each subband into a plurality of tiles;

means for entropy encoding each tile;

means for selecting a plurality of desired resolutions from the multiple resolutions for inclusion in a bitstream; and means for arranging encoded tiles into the bitstream, such that, for each level between each pair of adjacent selected resolutions, the entropy encoded tiles representing substantially the same portion of the image are contiguous in the bitstream.

19. The apparatus as claimed in claim 18, wherein the coded representation is a multiple level discrete wavelet transform of the digital image.

20. The apparatus as claimed in claim 18, wherein the subbands are arranged in levels of decreasing order.

21. The apparatus as claimed in claim 18, wherein the entropy encoding means further includes quantization means.

22. The apparatus as claimed in claim 18, wherein each tile comprises a plurality of transform coefficients.

23. The apparatus as claimed in claim 22, wherein the arranging means further includes means for arranging transform coefficients into the bitstream in a predetermined order.

24. The apparatus as claimed in claim 23, wherein the predetermined order is a raster order of the coefficients in each tile.

25. The apparatus as claimed in claim 23, wherein the predetermined order is an interleaving of binary bits of the coefficients in each tile.

26. An apparatus for encoding a digital image, to provide substantially random access to portions of the image at a plurality of nominated resolutions, said apparatus including:
means for applying a linear transform to the image to produce a plurality of transform coefficients in a frequency domain;
means for grouping the transform coefficients into frequency subbands, each subband representing a range of frequencies of the image, wherein the grouping is characterised by one low frequency subband and a plurality of high frequency subbands arranged in levels, and wherein each level represents frequency contributions between adjacent nominated resolutions of the image;
means for dividing each frequency subband into a plurality of tiles, each tile comprising at least one of the transform coefficients;
means for quantizing and entropy coding each tile; and
means for arranging the encoded tiles into a bitstream such that, for each level, those encoded tiles which substantially correspond to the same portion of the image are contiguous in the bitstream.

27. An apparatus for encoding a digital image into a bitstream, to provide substantially random access to portions of the image at a plurality of nominated resolutions, said apparatus including:
means for applying a discrete wavelet transform to the image to produce a non-redundant multiple resolution frequency domain representation of the image, the representation comprising one low frequency subband and a plurality of high frequency subbands arranged in levels, wherein each level represents frequency contributions between adjacent resolutions of the image;
means for dividing each frequency subband into a plurality of tiles;
means for quantizing and entropy coding each tile;
means for nominating desired resolutions of the digital image; and
means for arranging encoded tiles into a bitstream such that, for each level between nominated resolutions, those tiles which substantially correspond to the same portion of the image are contiguous in the bitstream.

28. An apparatus for encoding a digital image including:
means for applying a linear transform to the image to produce a non-redundant multiple resolution frequency domain representation of the image, the representation comprising a plurality of levels, wherein each level represents frequency contributions between adjacent resolutions of the image;
means for dividing the non-redundant multiple resolution frequency domain representation into a plurality of tiles;
means for quantizing and entropy coding each tile;
means for nominating desired resolutions of the digital image; and
means for arranging in a contiguous manner, for each level between nominated resolutions, those tiles which substantially correspond to the same portion of the image.

29. An apparatus for encoding a coded representation of a digital image, wherein the coded representation includes a non-redundant hierarchical code, having one low frequency subband and a plurality of high frequency subbands arranged in levels, which levels combine to represent multiple resolutions of the image, said apparatus including:
means for dividing each subband into a plurality of tiles;
means for selecting a predetermined number of the levels from the multiple resolutions;
means for entropy encoding each tile;
means for processing the selected levels in a predetermined sequential order; and
means for arranging in a contiguous manner, for each level in the sequence to a current level not processed by said processing means, each entropy encoded tile representing substantially the same portion of image into a bitstream.

30. An apparatus for encoding a digital image into a bitstream, said apparatus including:
means for applying a discrete wavelet transform to the image to produce a non-redundant multiple resolution frequency domain representation of the image, the representation comprising one low frequency subband and a plurality of high frequency subbands arranged in levels, wherein each level represents frequency contributions between adjacent resolutions of the image;
means for dividing each frequency subband into a plurality of tiles;
means for quantizing and entropy coding each tile;
means for arranging into the stream bitstream in a predetermined order each entropy tile of a DC subband; and
means for arranging in a contiguous manner each set of three encoded tiles belonging to each of three AC subbands respectively, which substantially correspond to the same portion of the image at each level, into the bitstream.

31. An apparatus for encoding a digital image into a bitstream, said apparatus including:
means for applying a discrete wavelet transform to the image to produce a non-redundant multiple resolution frequency domain representation of the image, the representation comprising a DC subband and a plurality of AC subbands arranged in a hierarchical structure having a plurality of levels, wherein each level represents frequency contributions between adjacent resolutions of the image;
means for dividing each frequency subband into a plurality of tiles;
means for grouping each tile, substantially corresponding to a same portion of the digital image, at each level of the AC subbands into tile triplets;
means for entropy coding each tile of a DC subband and each tile triplet of the AC subbands;
means for arranging in a predetermined order each entropy encoded tile of a DC subband and each entropy encoded tile triplet into the bitstream.

32. The apparatus claimed in claim 31, wherein the levels are arranged in a hierarchical structure comprising the DC subband and the AC subbands, which AC subbands are arranged in decreasing level order substantially according to their increasing subband frequency.

33. The apparatus as claimed in claim 32, wherein the arranging means arranges the AC subbands in decreasing level order.

34. An apparatus for encoding a sequential stream of data for providing substantially random access to portions of an image at a plurality of predetermined resolutions, the stream including a non-redundant multiple resolution frequency domain representation of the image, the representation comprising one low frequency subband and a plurality of high frequency subbands arranged in levels, wherein each subband is divided into a plurality of tiles and each level represents frequency contributions between adjacent resolutions of the image, and wherein each tile represents a frequency contribution to a portion of the image at a predetermined resolution, said apparatus including:

means for inserting at most one pointer in the sequential stream for each set of tiles which correspond to substantially a same spatial portion of the image for each level to access a portion of the digital image.

35. A computer program product comprising a computer readable medium having recorded thereon a computer program for encoding a coded representation of a digital image, wherein the coded representation includes a non-redundant hierarchical code, having one low frequency subband and a plurality of high frequency subbands arranged in levels, which levels combine to represent multiple resolutions of the image, said computer program product including:

code for a division step, of dividing each subband into a plurality of tiles;

code for an entropy encoding step, of entropy encoding each tile;

code for a selection step, of selecting a plurality of desired resolutions from the multiple resolutions for inclusion in a bitstream; and code for an arrangement step, of arranging encoded tiles into the bitstream such that, for each level between each pair of adjacent selected resolutions, the entropy encoded tiles representing substantially the same portion of the image are contiguous in the bitstream.

36. The computer program product as claimed in claim 35, wherein the coded representation is a multiple level discrete wavelet transform of the digital image.

37. The computer program product as claimed in claim 35, wherein the subbands are arranged in levels of decreasing order.

38. The computer program product as claimed in claim 35, wherein said entropy encoding step further includes a quantization step.

39. A computer program product comprising a computer readable medium having recorded thereon a computer program for encoding a digital image, to provide substantially random access to portions of the image at a plurality of nominated resolutions, said computer program product including:

code for an applying step, of applying a linear transform to the image to produce a plurality of transform coefficients in a frequency domain;

code for a grouping step, of grouping the transform coefficients into frequency subbands, each subband representing a range of frequencies of the image, wherein the grouping is characterized by one low frequency subband and a plurality of high frequency subbands arranged in levels, and wherein each level represents frequency contributions between adjacent nominated resolutions of the image;

code for a division step, of dividing each frequency subband into a plurality of tiles, each tile comprising at least one of the transform coefficients;

code for a quantizing and entropy step, of quantizing and entropy coding each tile; and code for an arranging step, of arranging the encoded tiles into a bitstream such that, for each level, those encoded tiles which substantially correspond to the same portion of the image are contiguous in the bitstream.

40. A computer program product comprising a computer readable medium having recorded thereon a computer program for encoding a digital image into bitstream, to provide substantially random access to portions of the image at a plurality of nominated resolutions, said computer program product including:

code for an applying step, of applying a discrete wavelet transform to the image to produce a non-redundant multiple resolution frequency domain representation of the image, the representation comprising one low frequency subband and a plurality of high frequency subbands arranged in levels, wherein each level represents frequency contributions between adjacent resolutions of the image;

code for a division step, of dividing each frequency subband into a plurality of tiles;

code for a quantizing and entropy step, of quantizing and entropy coding each tile;

code for a nomination step, of nominating desired resolutions of the digital image; and code for an arranging step, of arranging encoded tiles into a bitstream such that, for each level between nominated resolutions, those tiles which substantially correspond to the same portion of the image are contiguous in the bitstream.

41. A computer program product comprising a computer readable medium having recorded thereon a computer program for encoding a digital image, said computer program product including:

code for an applying step, of applying a linear transform to the image to produce a non-redundant multiple resolution frequency domain representation of the image, the representation comprising a plurality of levels, wherein each level represents frequency contributions between adjacent resolutions of the image;

code for a division step, of dividing the non-redundant multiple resolution frequency domain representation into a plurality of tiles;

code for a quantizing and entropy step, of quantizing and entropy coding each tile;

code for a nomination step, of nominating desired resolutions of the digital image; and code for an arranging step, of arranging in a contiguous manner, for each level between nominated resolutions, those tiles which substantially correspond to the same portion.

42. A computer program product comprising a computer readable medium having recorded thereon a computer program for encoding a coded representation of a digital image, wherein the coded representation includes a non-redundant hierarchical code, having one low frequency subband and a plurality of high frequency subbands arranged in levels, which levels combine to represent multiple resolutions of the image, said computer program product including:

code for a division step, of dividing each subband into a plurality of tiles;

code for a selection step, of selecting a predetermined number of the levels from the multiple resolutions;

code for an entropy encoding step, of entropy encoding each tile;

code for a processing step, of processing the selected levels in a predetermined sequential order; and code for an arranging step, of arranging in a contiguous manner, for each level in the sequence to a current level not processed by said processing step, each entropy encoded tile representing substantially the same portion of image into a bitstream.

43. A computer program product comprising a computer readable medium having recorded thereon a computer program for encoding a digital image into a bitstream, said computer program product including:

code for an applying step, of applying a discrete wavelet transform to the image to produce a non-redundant multiple resolution frequency domain representation of the image, the representation comprising one low frequency subband and a plurality of high frequency subbands arranged in levels, wherein each level represents frequency contributions between adjacent resolutions of the image;

code for a division step, of dividing each frequency subband into a plurality of tiles;

code for a quantizing and entropy step, of quantizing and entropy coding each tile;

code for a first arranging step, of arranging into the bitstream in a predetermined order each entropy tile of a DC subband; and code for a second arranging step, of arranging in a contiguous manner each set of three encoded tiles belonging to each of three AC subbands respectively, which substantially correspond to the same portion of the image at each level, into the bitstream.

44. A computer program product comprising a computer readable medium having recorded thereon a computer program for encoding a digital image into a bitstream, said computer program product including:

code for an applying step, of applying a discrete wavelet transform to the image to produce a non-redundant multiple resolution frequency domain representation of the image, the representation comprising a DC subband and a plurality of AC subbands arranged in a hierarchical structure having a plurality of levels, wherein each level represents frequency contributions between adjacent resolutions of the image;

code for an division step, of dividing each frequency subband into a plurality of tiles;

code for a grouping step, of grouping each tile, substantially corresponding to a same portion of the digital image, at each level of the AC subbands into tile triplets;

code for an entropy coding step, of entropy coding each tile of a DC subband and each tile triplet of the AC subbands;

code for an arranging step, of arranging in a predetermined order each entropy encoded tile of a DC subband and each entropy encoded tile triplet into the bitstream.

45. The computer program product as claimed in claim 44, wherein the levels are arranged in a hierarchical structure comprising the DC subband and the AC subbands, which AC subbands are arranged in decreasing level order substantially according to their increasing subband frequency.

46. The computer program product as claimed in claim 45, wherein said arranging step arranges AC subbands in decreasing level order.

47. The computer program product as claimed in claim 35, wherein each tile comprises a plurality of transform coefficients.

48. The computer program product as claimed in claim 47, wherein said arranging step further includes code for a second arranging step, of arranging transform coefficients into the bitstream in a predetermined order.

49. The computer program product as claimed in claim 48, wherein the predetermined order is a raster order of the coefficients in each tile.

50. The computer program product as claimed in claim 48, wherein the predetermined order is an interleaving of binary bits of the coefficients in each tile.

51. A computer program product comprising a computer readable medium having recorded thereon a computer program for encoding a sequential stream of data for providing substantially random access to portions of an image at a plurality of predetermined resolutions, the stream including a non-redundant multiple resolution frequency domain representation of the image, the representation comprising one low frequency subband and a plurality of high frequency subbands arranged in levels, wherein each subband is divided into a plurality of tiles and each level represents frequency contributions between adjacent resolutions of the image, and wherein each tile represents a frequency contribution to a portion of the image at a predetermined resolution, said computer program product including:

code for an insertion step, of inserting at most one pointer in the sequential stream for each set of tiles which correspond to substantially a same spatial portion of the image for each level to access a portion of the digital image.

52. A method of encoding a digital image, the method including the steps of:

applying a linear transform to the image to produce a non-redundant multiple resolution frequency domain representation of the image, the representation comprising one low frequency subband and a plurality of high frequency subbands arranged in levels, wherein each level represents frequency contributions between adjacent resolutions of the image and each subband comprises a plurality of tiles; and entropy coding each tile into a bitstream, wherein said entropy coding step comprises the following sub-steps:
  entropy encoding the tiles of the low frequency subband into the bitstream; and
  entropy encoding tile triplets of the high frequency subbands into the bitstream in level and tile triplet order.

53. A method as claimed in claim 52, wherein the method further includes the step of:

nominating two or more levels as one level for the purposes of entropy encoding the tile triplets tiles of the high frequency subbands into the bitstream in level and tile triplet order.

54. The method as claimed in claim 52, wherein the coded representation is a multiple level discrete wavelet transform of the digital image.

55. The method as claimed in claim 52, wherein the high frequency subbands are entropy encoded in levels of decreasing order.

56. The method as claimed in claim 55, wherein the high frequency subbands of the same level are entropy encoded in tile triplets of increasing order.

57. The method as claimed in claim 52, wherein the entropy encoding step further includes a quantization step.

58. A method as claimed in claim 52, wherein said entropy encoding step of the tile triplets of the high frequency subbands comprises:

entropy encoding a tile triplet as a single unit.

59. A method as claimed in claim 52, wherein the tiles are of a constant size.

60. A method as claimed in claim 52, wherein each subband comprises an equal number of tiles.

61. An apparatus for encoding a digital image, the apparatus including:
   means for applying a linear transform to the image to produce a non-redundant multiple resolution frequency domain representation of the image, the representation comprising one low frequency subband and a plurality of high frequency subbands arranged in levels, wherein each level represents frequency contributions between adjacent resolutions of the image and each subband comprises a plurality of tiles; and
   means for entropy coding each tile into a bitstream, wherein said entropy coding means comprises the following:
      means for entropy encoding the tiles of the low frequency subband into the bitstream; and
      means for entropy encoding tile triplets of the high frequency subbands into the bitstream in level and tile triplet order.

62. The apparatus as claimed in claim 61, wherein the apparatus further includes:
   means for nominating two or more levels as one level for the purposes of entropy encoding the tile triplets of the high frequency subbands into the bitstream in level and tile triplet order.

63. The apparatus as claimed in claim 61, wherein the coded representation is a multiple level discrete wavelet transform of the digital image.

64. The apparatus as claimed in claim 61, wherein the high frequency subbands are entropy encoded in levels of decreasing order.

65. The apparatus as claimed in claim 64, wherein the high frequency subbands of the same level are entropy encoded in tile triplets of increasing order.

66. The apparatus as claimed in claim 61, wherein the entropy encoding means further includes a quantization means.

67. An apparatus as claimed in claim 61, wherein said means for entropy encoding the tile triplets of the high frequency subbands comprises means for entropy encoding a tile triplet as a single unit.

68. An apparatus as claimed in claim 61, wherein the tiles are of a constant size.

69. An apparatus as claimed in claim 61, wherein each subband comprises an equal number of tiles.

70. A computer program product comprising a computer readable medium having recorded thereon a computer program for encoding a digital image, the computer program product comprising:
   code for an applying step, of applying a linear transform to the image to produce a non-redundant multiple resolution frequency domain representation of the image, the representation comprising one low frequency subband and a plurality of high frequency subbands arranged in levels, wherein each level represents frequency contributions between adjacent resolutions of the image and each subband comprises a plurality of tiles; and
   code for an entropy coding step, of entropy coding each tile into a bitstream, wherein said entropy coding step comprises:
      code for a first entropy encoding step, of entropy encoding the tiles of the low frequency subband into the bitstream; and
      code for a second entropy encoding step, of entropy encoding tile triplets of the high frequency subbands into the bitstream in level and tile triplet order.

71. The computer program product as claimed in claim 70, wherein the computer program product further includes:
   code for a nomination step, of nominating two or more levels as one level for the purposes of entropy encoding the tile triplets of the high frequency subbands into the bitstream in level and tile triplet order.

72. The computer program product as claimed in claim 70, wherein the coded representation is a multiple level discrete wavelet transform of the digital image.

73. The computer program product as claimed in claim 70, wherein the high frequency subbands are entropy encoded in levels of decreasing order.

74. The computer program product as claimed in claim 73, wherein the high frequency subbands of the same level are entropy encoded in tile triplets of increasing order.

75. The computer program product as claimed in claim 70, wherein the entropy coding step further includes a code for a quantization step.

76. The computer program product as claimed in claim 70, wherein said entropy encoding step of, entropy encoding the tile triplets of the high frequency subbands includes entropy encoding a tile triplet as a single unit.

77. The computer program product as claimed in claim 70, wherein the tiles are of a constant size.

78. The computer program product as claimed in claim 70, wherein each subband comprises an equal number of tiles.

79. A method of encoding a coded representation of a digital image, wherein the coded representation comprises a non redundant hierarchical code, having one low frequency subband and a plurality of high frequency subbands arranged in levels, which levels combine to represent multiple resolutions of the image, said method comprising the steps of:
   dividing each subband into a plurality of tiles;
   entropy encoding each tile; and
   arranging entropy encoded tiles into a bitstream such that, for each level between each pair of resolutions of two or more predetermined resolutions of the multiple resolutions, the entropy encoded tiles representing substantially the same portion of the image are contiguous in the bitstream.

80. A method of encoding a digital image into a bitstream, said method comprising the steps of:
   linear transforming the image to produce a non-redundant hierarchical code, having one low frequency subband and a plurality of high frequency subbands arranged in levels, which levels combine to represent multiple resolutions of the image;
   dividing each subband into a plurality of tiles;
   entropy encoding each tile; and
   arranging entropy encoded tile into the bitstream such that, for each level between each pair of resolutions of two or more predetermined resolutions of the multiple resolutions, the entropy encoded tiles representing substantially the same portion of the image are contiguous in the bitstream.

81. A method of encoding a coded representation of a digital image, wherein the coded representation comprises a non-redundant hierarchical code, having one low frequency subband and a plurality of high frequency subbands arranged in levels, which levels combine to represent multiple resolutions of the image and each subband comprises a plurality of tiles, said method comprising the step of:

entropy encoding the tiles of the high frequency subbands into the bitstream according to a predetermined level order and the tiles of each level according to a predetermined tile order, wherein spatially corresponding tiles are arranged contiguously in the bitstream.

82. An apparatus for encoding a coded representation of a digital image, wherein the coded representation comprises a non-redundant hierarchical code, having one low frequency subband and a plurality of high frequency subbands arranged in levels, which levels combine to represent multiple resolutions of the image, said apparatus comprising:

means for dividing each subband into a plurality of tiles;

means for entropy encoding each tile; and means for arranging entropy encoded tiles into a bitstream such that, for each level between each pair of resolutions of two or more predetermined resolutions of the multiple resolutions, the entropy encoded tiles representing substantially the same portion of the image are contiguous in the bitstream.

83. An apparatus for encoding a digital image into a bitstream, said apparatus comprising:

means for linear transforming the image to produce a non-redundant hierarchical code, having one low frequency subband and a plurality of high frequency subbands arranged in levels, which levels combine to represent multiple resolutions of the image;

means for dividing each subband into a plurality of tiles;

means for entropy encoding each tile; and means for arranging entropy encoded tiles into the bitstream such that, for each level between each pair of resolutions of two or more predetermined resolutions of the multiple resolutions, the entropy encoded tiles representing substantially the same portion of the image are contiguous in the bitstream.

84. An apparatus for encoding a coded representation of a digital image, wherein the coded representation comprises a non-redundant hierarchical code, having one low frequency subband and a plurality of high frequency subbands arranged in levels, which levels combine to represent multiple resolutions of the image and each subband comprises a plurality of tiles, said apparatus comprising:

means for entropy encoding the tiles of the high frequency subbands into the bitstream according to a predetermined level order and the tiles of each level according to a predetermined tile order, wherein spatially corresponding tiles are arranged contiguously in the bitstream.

85. A computer readable medium comprising a computer program for encoding a coded representation of a digital image, wherein the coded representation comprises a non-redundant hierarchical code, having one low frequency subband and a plurality of high frequency subbands arranged in levels, which levels combine to represent multiple resolutions of the image, said computer program comprising:

code for a division step, of dividing each subband into a plurality of tiles;

code for an entropy encoding step, of entropy encoding each tile; and code for an arranging step, of arranging the entropy encoded tiles into a bitstream such that, for each level between each pair of resolutions of two or more predetermined resolutions of the multiple resolutions, the entropy encoded tiles representing substantially the same portion of the image are contiguous in the bitstream.

86. A computer readable medium comprising a computer program for encoding a digital image into a bitstream, said computer program comprising:

code for a transforming step, of linear transforming the image to produce a non-redundant hierarchical code, having one low frequency subband and a plurality of high frequency subbands arranged in levels, which levels combine to represent multiple resolutions of the image;

code for a division step, of dividing each subband into a plurality of tiles;

code for an entropy encoding step, of entropy encoding each tile; and code for an arranging step, of arranging the entropy encoded tiles into the bitstream such that, for each level between each pair of resolutions of two or more predetermined resolutions of the multiple resolutions, the entropy encoded tiles representing substantially the same portion of the image are contiguous in the bitstream.

87. A computer readable medium comprising a computer program for encoding a coded representation of a digital image, wherein the coded representation comprises a non-redundant hierarchical code, having one low frequency subband and a plurality of high frequency subbands arranged in levels, which levels combine to represent multiple resolutions of the image and each subband comprises a plurality of tiles, said computer program comprising:

code for an entropy encoding step, of entropy encoding the tiles of the high frequency subbands into the bitstream according to a predetermined level order and the tiles of each level according to a predetermined tile order, wherein spatially corresponding tiles are arranged contiguously in the bitstream.

* * * * *

UNITED STATES PATENT AND TRADEMARK OFFICE
CERTIFICATE OF CORRECTION

PATENT NO.     : 6,763,139 B1
DATED          : July 13, 2004
INVENTOR(S)    : James Philip Andrew It is certified that error appears in the above-identified patent and that said Letters Patent is hereby corrected as shown below:

<u>Title page,</u>
Item [57], ABSTRACT,
Line 1, "The method" should read -- An image coding method -- and "from a" should read -- from an --.

<u>Column 2,</u>
Line 60, "contiguous" should read -- in a contiguous --.

<u>Column 4,</u>
Line 36, "invention." should read -- invention; --;
Line 42, "accordance" should read -- in accordance --; and
Line 45, "invention" should read -- invention; --.

<u>Column 6,</u>
Line 55, "non overlapping" should read -- non-overlapping --.

<u>Column 7,</u>
Line 19, "of" should be deleted.

<u>Column 8,</u>
Line 14, "(0,0)" should read -- (0,0)) --;
Line 32, "on;" should read -- on: --; and
Line 42, "which ever" should read -- whichever --.

<u>Column 9,</u>
Line 34, "form" should read -- from --;
Line 43, "outputed." should read -- outputted. --;
Line 52, "puted." should read -- putted. --; and
Line 53, "outputed" should read -- outputted --.

<u>Column 10,</u>
Line 6, "three dimensional" should read -- three-dimensional --; and
Line 57, "three tile" should read -- three tiles --.

<u>Column 11,</u>
Line 17, "implemented" should read -- be implemented --.

UNITED STATES PATENT AND TRADEMARK OFFICE
CERTIFICATE OF CORRECTION

PATENT NO. : 6,763,139 B1
DATED : July 13, 2004
INVENTOR(S) : James Philip Andrew It is certified that error appears in the above-identified patent and that said Letters Patent is hereby corrected as shown below:

Column 12,
Line 6, "replace" should read -- replaced --;
Line 21, "subregion." should read -- subregions. --; and
Line 25, "ficient" should read -- ficients. --.

Column 14,
Line 46, "call" should read -- called --.

Column 16,
Line 8, "bus 114" should read -- bus 1214 --;
Line 23, "Sun parcstation$^{TM}$," should read -- Sun Sparcstation$^{TM}$, --;
Line 30, "processor 104," should read -- processor 1204, --; and
Line 67, "the of" should read -- of the --.

Column 20,
Line 15, "subbands;" should read -- subbands; and --.

Column 22,
Line 35, "stream" should be deleted; and
Line 60, "subbands;" should read -- subbands; and --.

Column 24,
Line 12, "bitstream," should read -- a bitstream, --.

Column 25,
Line 47, "an" should read -- a --;
Line 55, "subbands;" should read -- subbands; and --.

Column 26,
Line 2, "35," should read -- 45, --; and
Line 51, "tiles" should be deleted.

UNITED STATES PATENT AND TRADEMARK OFFICE
CERTIFICATE OF CORRECTION

PATENT NO. : 6,763,139 B1
DATED : July 13, 2004
INVENTOR(S) : James Philip Andrew It is certified that error appears in the above-identified patent and that said Letters Patent is hereby corrected as shown below:

Column 28,
Line 22, "of," should read -- of --;
Line 32, "non redundant" should read -- non-redundant --; and
Line 55, "tile" should read -- tiles --.

Signed and Sealed this

Eighteenth Day of October, 2005

JON W. DUDAS
*Director of the United States Patent and Trademark Office*